(12) United States Patent
Sadiq et al.

(10) Patent No.: US 10,779,294 B2
(45) Date of Patent: Sep. 15, 2020

(54) PRIORITIZED RTS-CTS RESOURCES

(71) Applicant: QUALCOMM Incorporated, San Diego, CA (US)

(72) Inventors: Bilal Sadiq, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 578 days.

(21) Appl. No.: 14/827,858

(22) Filed: Aug. 17, 2015

(65) Prior Publication Data
US 2016/0150552 A1    May 26, 2016

Related U.S. Application Data

(60) Provisional application No. 62/082,525, filed on Nov. 20, 2014.

(51) Int. Cl.
| | |
|---|---|
| *H04W 72/10* | (2009.01) |
| *H04W 52/02* | (2009.01) |
| *H04W 72/04* | (2009.01) |
| *H04W 74/08* | (2009.01) |

(52) U.S. Cl.
CPC ....... *H04W 72/10* (2013.01); *H04W 52/0225* (2013.01); *H04W 72/0406* (2013.01); *H04W 72/0453* (2013.01); *H04W 74/0816* (2013.01); *Y02D 70/00* (2018.01); *Y02D 70/122* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/21* (2018.01)

(58) Field of Classification Search
CPC . H04W 72/10; H04W 72/04; H04W 74/0816; H04W 74/08; H04W 52/0225; H04W 72/0453; H04W 72/0406
USPC .............. 370/312, 329, 336, 348, 328, 241
See application file for complete search history.

(56) References Cited

U.S. PATENT DOCUMENTS

| | | | | |
|---|---|---|---|---|
| 8,305,948 B2 * | 11/2012 | Surineni | ........... | H04W 74/0816 370/310 |
| 9,002,282 B1 * | 4/2015 | de la Broise | ............ | H04B 1/40 455/63.1 |
| 2003/0012176 A1 * | 1/2003 | Kondylis | .............. | H04W 28/16 370/348 |

(Continued)

FOREIGN PATENT DOCUMENTS

| | | |
|---|---|---|
| CN | 103024748 A | 4/2013 |
| EP | 2555578 A1 | 2/2013 |
| WO | WO-2013182250 A1 | 12/2013 |

OTHER PUBLICATIONS

International Search Report and Written Opinion—PCT/US2015/056738—ISA/EPO— dated Jan. 29, 2016.

*Primary Examiner* — Kwang B Yao
*Assistant Examiner* — Syed M Bokhari
(74) *Attorney, Agent, or Firm* — Loza & Loza, LLP Qualcomm Incorporated

(57) ABSTRACT

The disclosure relates in some aspects to dynamically reserving a channel for performing connection setup and/or communicating high priority messages. RTS-CTS resources may be statically associated with different functions and different priorities. The highest priority RTS-CTS resource (or one of the highest priority RTS-CTS resources) may be used to set up connections between devices and/or communicate high priority messages between devices.

23 Claims, 19 Drawing Sheets

(56) References Cited

U.S. PATENT DOCUMENTS

| | | | |
|---|---|---|---|
| 2009/0109938 A1* | 4/2009 | Singh | H04W 74/0816 370/337 |
| 2013/0058218 A1* | 3/2013 | Wu | H04W 74/0816 370/241 |
| 2013/0083779 A1* | 4/2013 | Ahn | H04W 72/04 370/336 |
| 2013/0114531 A1* | 5/2013 | Ahn | H04W 72/04 370/329 |
| 2013/0208708 A1* | 8/2013 | Nezou | H04W 72/0446 370/336 |
| 2013/0308549 A1* | 11/2013 | Madan | H04W 28/26 370/329 |
| 2014/0003336 A1* | 1/2014 | Padden | H04W 72/10 370/328 |
| 2014/0071917 A1 | 3/2014 | Kim et al. | |
| 2014/0112233 A1* | 4/2014 | Bodas | H04W 72/1231 370/312 |
| 2014/0160966 A1 | 6/2014 | Kang et al. | |
| 2014/0161097 A1 | 6/2014 | Morioka | |
| 2015/0201401 A1* | 7/2015 | Lahetkangas | H04L 1/0079 370/329 |
| 2015/0334752 A1* | 11/2015 | Li | H04W 74/0816 455/418 |

\* cited by examiner

PRIORITIZED RTS-CTS RESOURCES

CROSS-REFERENCE TO RELATED APPLICATION(S)

This application claims priority to and the benefit of provisional patent application No. 62/082,525 filed in the U.S. Patent and Trademark Office on Nov. 20, 2014, the entire content of which is incorporated herein by reference.

BACKGROUND

Field of the Disclosure

Aspects of the disclosure relate generally to wireless communication, and more specifically, but not exclusively, to prioritized request-to-send and clear-to-send (RTS-CTS) resources.

Description of Related Art

Wireless communication networks are widely deployed to provide various communication services such as telephony, video, data, messaging, broadcasts, and so on. Such networks, which are usually multiple access networks, support communication for multiple users by sharing the available network resources. As the demand for mobile broadband access continues to increase, research and development continue to advance wireless communication technologies not only to meet the growing demand for mobile broadband access, but to advance and enhance the user experience.

Consider, for example, a communication network including many device-to-device (D2D) links. In some scenarios, the links contend for the communication channel using a connection scheduling algorithm based on request-to-send (RTS) and clear-to-send (CTS). As part of physical layer (PHY) connection setup, each link acquires a locally unique RTS-CTS resource pair and subsequently uses this RTS-CTS resource to participate in distributed link scheduling. Here, an RTS-CTS handshake is employed whereby a priority is associated with each link's RTS-CTS signal. In case of contention between links, relatively higher priority links get preferential access to the channel and lower priority links yield. The links that finally access the communication channel form an independent set (e.g., the links don't strongly interfere with each other). In such a network, certain timeslots may be designated for D2D connection setup. In this way, idle devices may switch to a low power (sleep) mode between these designated timeslots, thereby conserving battery power.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

The disclosure relates in some aspects to dynamically reserving a resource (e.g., a channel) for performing connection setup and/or communicating high priority messages, instead of periodically pre-allocating resources (e.g., timeslots) for this purpose. To this end, RTS-CTS resources may be associated with different functions and/or different priorities. For example, the highest priority RTS-CTS resource (or one of the highest priority RTS-CTS resources) may be used to set up connections between devices. As another example, the highest priority RTS-CTS resource (or one of the highest priority RTS-CTS resources) may be used to broadcast high priority messages. Conversely, the lower priority resource is (or the lower priority resources are) used for other functions (e.g., associated with connections that have already been set up).

In one aspect, the disclosure provides an apparatus configured for communication that includes a memory device and a processing circuit coupled to the memory device. The processing circuit is configured to identify a request-to-send and clear-to-send (RTS-CTS) resource from a plurality of prioritized RTS-CTS resources, wherein the identified RTS-CTS resource is associated with a particular function and is assigned a priority that is higher than any priority assigned to any of the RTS-CTS resources that are not associated with the particular function; send a first RTS via the identified RTS-CTS resource; receive a first CTS via the identified RTS-CTS resource in response to the first RTS; and send a first message as a result of receiving the first CTS.

Another aspect of the disclosure provides a method for communication including identifying a request-to-send and clear-to-send (RTS-CTS) resource from a plurality of prioritized RTS-CTS resources, wherein the identified RTS-CTS resource is associated with a particular function and is assigned a priority that is higher than any priority assigned to any of the RTS-CTS resources that are not associated with the particular function; sending a first RTS via the identified RTS-CTS resource; receiving a first CTS via the identified RTS-CTS resource in response to the first RTS; and sending a first message as a result of receiving the first CTS.

Another aspect of the disclosure provides an apparatus configured for communication. The apparatus including means for identifying a request-to-send and clear-to-send (RTS-CTS) resource from a plurality of prioritized RTS-CTS resources, wherein the identified RTS-CTS resource is associated with a particular function and is assigned a priority that is higher than any priority assigned to any of the RTS-CTS resources that are not associated with the particular function; means for sending a first RTS via the identified RTS-CTS resource; and means for receiving a first CTS via the identified RTS-CTS resource in response to the first RTS, wherein the means for sending is configured to send a first message as a result of receiving the first CTS.

Another aspect of the disclosure provides a non-transitory computer-readable medium storing computer-executable code, including code to identify a request-to-send and clear-to-send (RTS-CTS) resource from a plurality of prioritized RTS-CTS resources, wherein the identified RTS-CTS resource is associated with a particular function and is assigned a priority that is higher than any priority assigned to any of the RTS-CTS resources that are not associated with the particular function; send a first RTS via the identified RTS-CTS resource; receive a first CTS via the identified RTS-CTS resource in response to the first RTS; and send a first message as a result of receiving the first CTS.

In one aspect, the disclosure provides an apparatus configured for communication that includes a memory device and a processing circuit coupled to the memory device. The processing circuit is configured to: identify a request-to-send and clear-to-send (RTS-CTS) resource from a plurality of prioritized RTS-CTS resources, wherein the identified RTS-CTS resource is associated with a particular function and is assigned a priority that is higher than any priority assigned to any of the RTS-CTS resources that are not associated with the particular function; receive a first RTS via the identified RTS-CTS resource; send a first CTS via the identified RTS-CTS resource in response to the first RTS; and receive a first message in response to the first CTS.

Another aspect of the disclosure provides a method for communication including: identifying a request-to-send and clear-to-send (RTS-CTS) resource from a plurality of prioritized RTS-CTS resources, wherein the identified RTS-CTS resource is associated with a particular function and is assigned a priority that is higher than any priority assigned to any of the RTS-CTS resources that are not associated with the particular function; receiving a first RTS via the identified RTS-CTS resource; sending a first CTS via the identified RTS-CTS resource in response to the first RTS; and receiving a first message in response to the first CTS.

Another aspect of the disclosure provides an apparatus configured for communication. The apparatus including: means for identifying a request-to-send and clear-to-send (RTS-CTS) resource from a plurality of prioritized RTS-CTS resources, wherein the identified RTS-CTS resource is associated with a particular function and is assigned a priority that is higher than any priority assigned to any of the RTS-CTS resources that are not associated with the particular function; means for receiving a first RTS via the identified RTS-CTS resource; and means for sending a first CTS via the identified RTS-CTS resource in response to the first RTS, wherein the means for receiving is configured to receive a first message in response to the first CTS.

Another aspect of the disclosure provides a non-transitory computer-readable medium storing computer-executable code, including code to: identify a request-to-send and clear-to-send (RTS-CTS) resource from a plurality of prioritized RTS-CTS resources, wherein the identified RTS-CTS resource is associated with a particular function and is assigned a priority that is higher than any priority assigned to any of the RTS-CTS resources that are not associated with the particular function; receive a first RTS via the identified RTS-CTS resource; send a first CTS via the identified RTS-CTS resource in response to the first RTS; and receive a first message in response to the first CTS.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the features discussed herein. In other words, while one or more implementations may be discussed as having certain features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
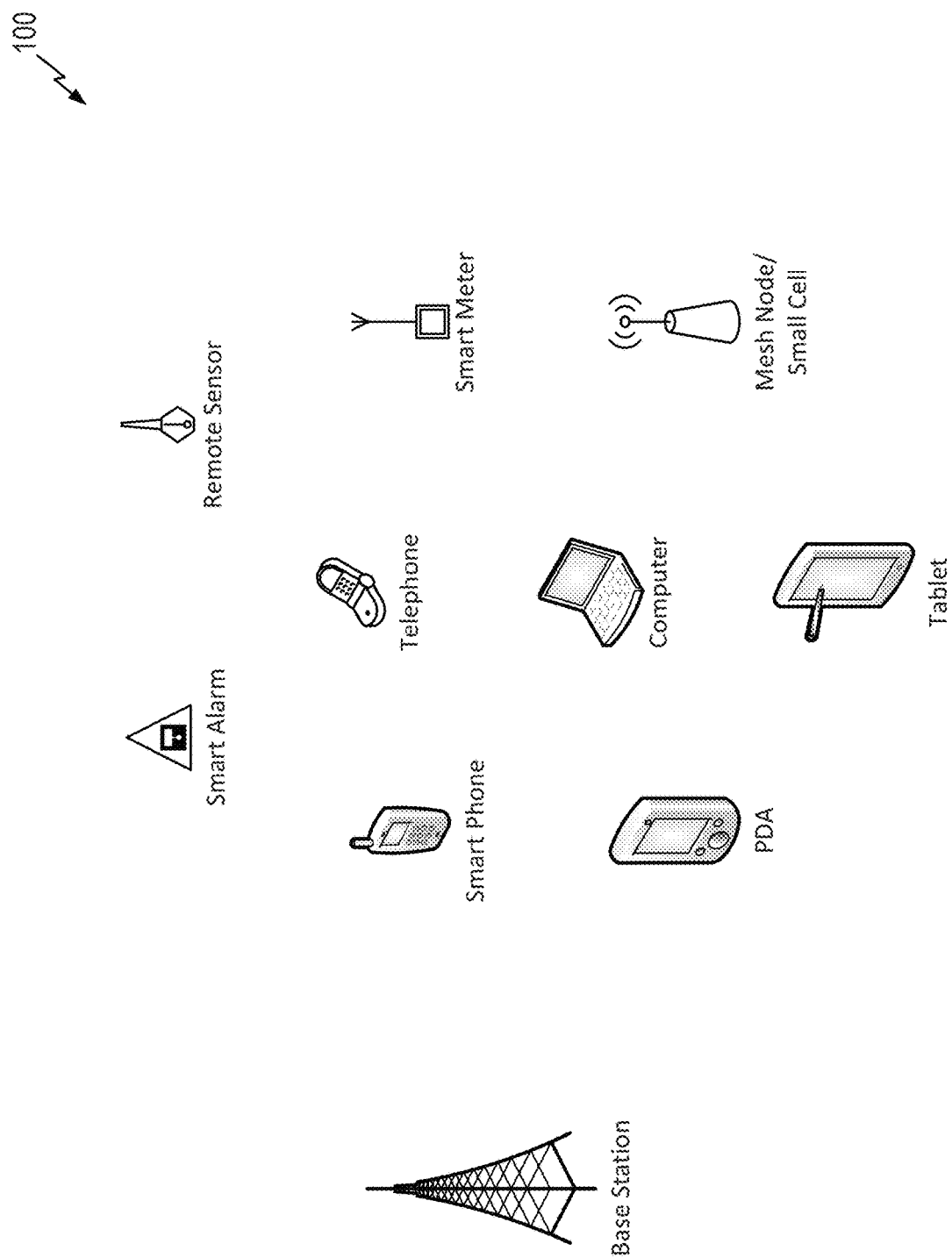
FIG. 1 is a schematic diagram of a wireless communication network within which one or more aspects of the disclosure may find application.

The various concepts presented throughout this disclosure may be implemented across a broad variety of communication systems, network architectures, and communication standards. Referring to FIG. 1, by way of example and without limitation, a wireless communication network 100 is shown including multiple communication entities as it may appear in some aspects of the disclosure. As described herein, a communication entity (e.g., device) may reside in, or be a part of, an access terminal (AT), a smart phone, a small cell, a base station, or other entity. Subordinate entities or mesh nodes may reside in, or be a part of, a smart alarm, a remote sensor, a smart phone, a telephone, a smart meter, a PDA, a personal computer, a mesh node, a tablet computer, or some other entity. Of course, the illustrated devices or components are merely examples, and any suitable node or device may appear within a wireless communication network within the scope of the disclosure.

Figure 2:
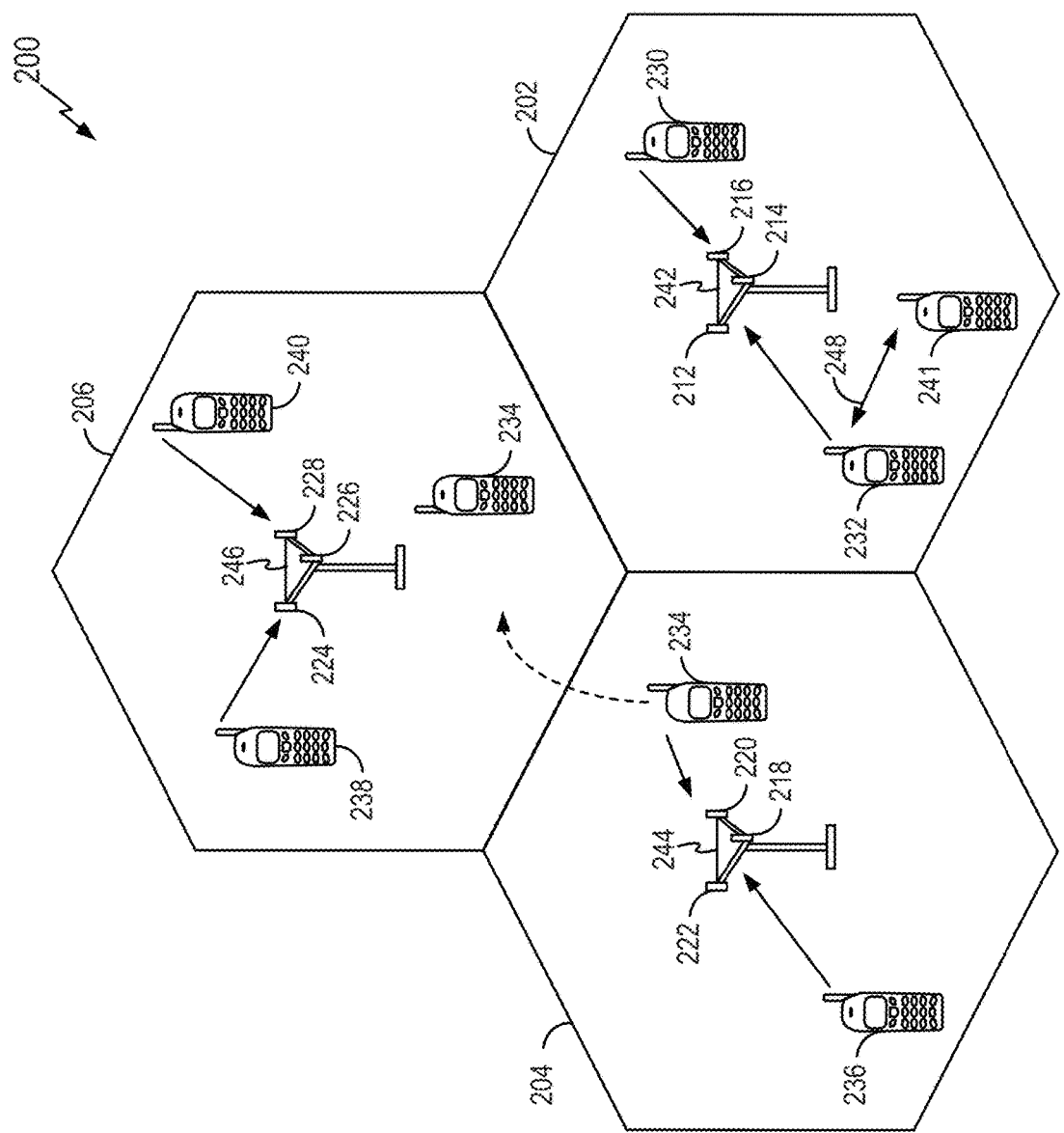
FIG. 2 is a schematic diagram illustrating an example of an access network in which one or more aspects of the disclosure may find application.

FIG. 2 illustrates an example of an access network 200 within which the entities of FIG. 1 may be implemented. The access network 200 can be implemented according to various network technologies including, without limitation, fifth generation (5G) technology, fourth generation (4G) technology, third generation (3G) technology, and other network architectures. Thus, various aspects of the disclosure may be extended to networks based on 3rd Generation Partnership Project (3GPP) Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The access network 200 includes multiple cellular regions (cells), including cells 202, 204, and 206, each of which may include one or more sectors. Cells may be defined geographically, e.g., by coverage area. In a cell that is divided into sectors, the multiple sectors within a cell can be formed by groups of antennas with each antenna responsible for communication with ATs in a portion of the cell. For example, in a cell 202, antenna groups 212, 214, and 216 may each correspond to a different sector. In a cell 204, antenna groups 218, 220, and 222 may each correspond to a different sector. In a cell 206, antenna groups 224, 226, and 228 may each correspond to a different sector.

The cells 202, 204, and 206 may include several access terminals (ATs) that may be in communication with one or more sectors of each cell 202, 204, or 206. For example, ATs 230 and 232 may be in communication with an access point (AP) 242, ATs 234 and 236 may be in communication with an AP 244, and ATs 238 and 240 may be in communication with an AP 246. As indicated by the dashed arrow in FIG. 2, AT 234 may move into cell 206 and thereafter be in communication with AP 246. Also, ATs 232 and 241 as well as other ATs may communicate via D2D signaling as indicated, for example, by the communication symbol 248. In various implementations, an AP may be referred to or implemented as a base station, a NodeB, an eNodeB, and so on; while an AT may be referred to or implemented as a user equipment (UE), a mobile station, and so on.

Figure 3:
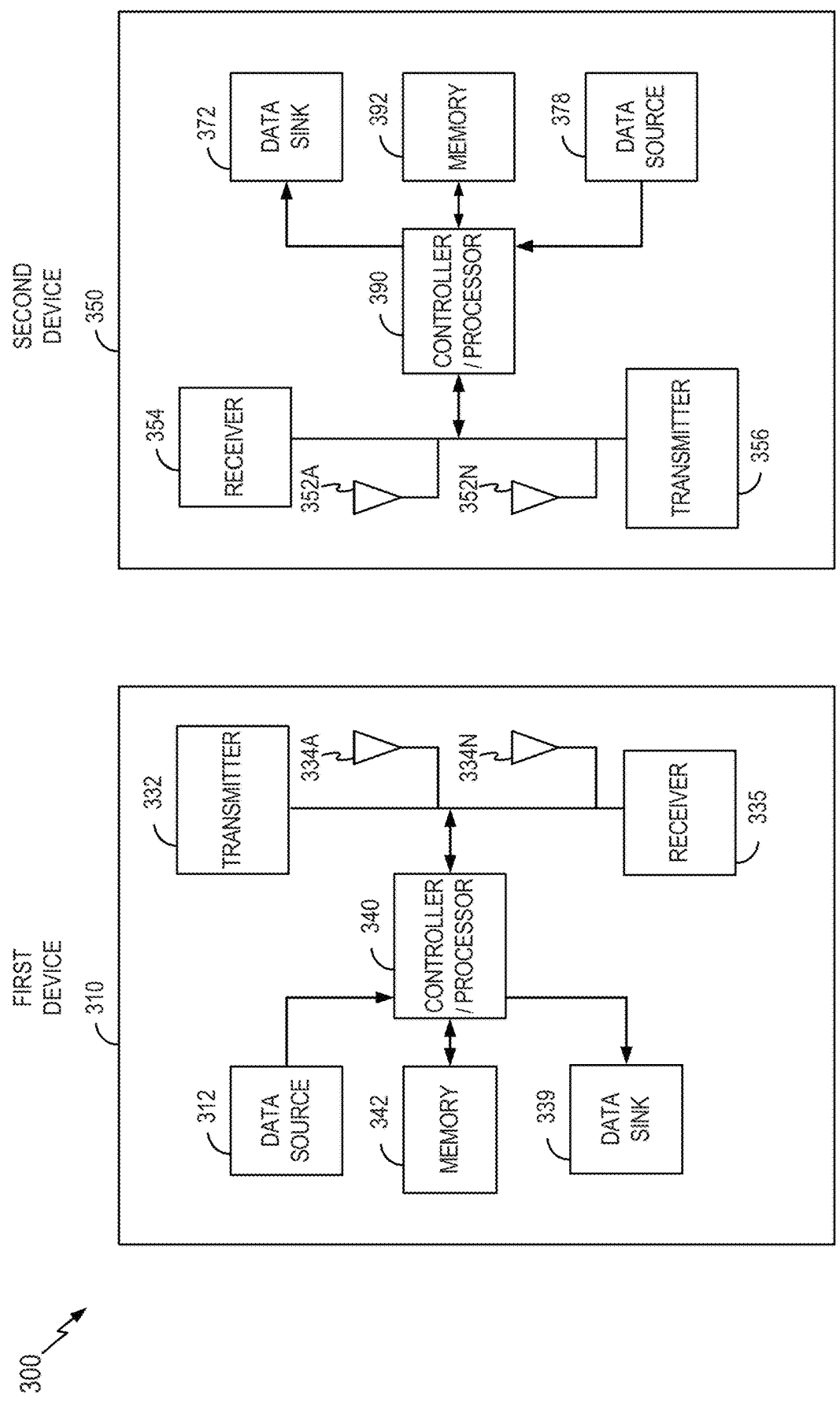
FIG. 3 is a block diagram illustrating an example of a first device in communication with a second device in a communication system according to some aspects of the disclosure.

FIG. 3 is a block diagram of system 300 including a first device 310 in communication with a second device 350, where the first device 310 and the second device 350 may be configured to provide functionality as taught herein. For example, the first device 310 and the second device 350 could be any of the devices in FIG. 1 or FIG. 2. In various operating scenarios, the first device 310 and/or the second device 350 may be a transmitter or transmitting device, or a receiver or receiving device, or both.

In a communication from the first device 310 to the second device 350, a controller or processor (controller/processor) 340 may receive data from a data source 312. Channel estimates may be used by a controller/processor 340 to determine the coding, modulation, spreading, and/or scrambling schemes for a transmitter 332. These channel estimates may be derived from a reference signal transmitted by the second device 350 or from feedback from the second device 350. The transmitter 332 may provide various signal conditioning functions including amplifying, filtering, and modulating frames onto a carrier for transmission over a wireless medium through antennas 334A-334N. The antennas 334A-334N may include one or more antennas, for example, including beam steering bidirectional adaptive antenna arrays, multiple-input multiple-output (MIMO) arrays, or any other suitable transmission/reception technologies.

At the second device 350, a receiver 354 receives the transmission through antennas 352A-352N (e.g., representing one or more antennas) and processes the transmission to recover the information modulated onto the carrier. The information recovered by the receiver 354 is provided to a controller or processor (controller/processor) 390. The controller/processor 390 descrambles and despreads the symbols, and determines the most likely signal constellation points transmitted by the first device 310 based on the modulation scheme. These soft decisions may be based on channel estimates computed by the controller/processor 390. The soft decisions are then decoded and deinterleaved to recover the data, control, and reference signals. Cyclic redundancy check (CRC) codes are then checked to determine whether the frames were successfully decoded. The data carried by the successfully decoded frames will then be provided to a data sink 372, which represents applications running in the second device 350 and/or various user interfaces (e.g., a display). Control signals carried by successfully decoded frames will be processed by the controller/processor 390. When frames are unsuccessfully decoded, the controller/processor 390 may also use an acknowledgement (ACK) and/or negative acknowledgement (NACK) protocol to support retransmission requests for those frames.

In the link from the second device 350 to the first device 310, data from a data source 378 and control signals from the controller/processor 390 are provided. The data source 378 may represent applications running in the second device 350 and various user interfaces (e.g., a keyboard). Similar to the functionality described in connection with the transmission by the first device 310, the controller/processor 390 provides various signal processing functions including CRC codes, coding and interleaving to facilitate forward error correction (FEC), mapping to signal constellations, spreading with orthogonal variable spreading factors (OVSFs), and scrambling to produce a series of symbols. Channel estimates, derived by the controller/processor 390 from a reference signal transmitted by the first device 310 or from feedback contained in a midamble transmitted by the first device 310, may be used to select the appropriate coding, modulation, spreading, and/or scrambling schemes. The symbols produced by the controller/processor 390 will be utilized to create a frame structure. The controller/processor 390 creates this frame structure by multiplexing the symbols with additional information, resulting in a series of frames. The frames are then provided to a transmitter 356, which provides various signal conditioning functions including amplification, filtering, and modulating the frames onto a carrier for transmission over the wireless medium through the antennas 352A-352N.

The transmission is processed at the first device 310 in a manner similar to that described in connection with the receiver function at the second device 350. A receiver 335 receives the transmission through the antennas 334A-334N and processes the transmission to recover the information modulated onto the carrier. The information recovered by the receiver 335 is provided to the controller/processor 340, which parses each frame. The controller/processor 340 performs the inverse of the processing performed by the controller/processor 390 in the second device 350. The data and control signals carried by the successfully decoded frames may then be provided to a data sink 339. If some of the frames were unsuccessfully decoded by the controller/processor 340, the controller/processor 340 may also use a positive acknowledgement (ACK) and/or negative acknowledgement (NACK) protocol to support retransmission requests for those frames.

The controller/processors 340 and 390 may be used to direct the operation at the first device 310 and the second device 350, respectively. For example, the controller/processors 340 and 390 may provide various functions including timing, peripheral interfaces, voltage regulation, power management, and other control functions. The computer readable media of memories 342 and 392 may store data and software for the first device 310 and the second device 350, respectively.

In accordance with various aspects of the disclosure, an element, or any portion of an element, or any combination of elements may be implemented with the controller/processors 340 and 390 (e.g., that may each include one or more processors). The controller/processors 340 and 390 are responsible for general processing, including the execution of software stored in the memory 342 or 392. The software, when executed by the controller/processors 340 and 390, causes the controller/processors 340 and 390 to perform the various functions described below for any particular apparatus. The memory 342 or 392 may also be used for storing data that is manipulated by the controller/processors 340 and 390 when executing software.

Some D2D networks employ a paging-based design where periodic reserved resources are used for paging and random access throughout the network. For example, such a network may employ a periodicity on the order of one second for paging and random access to mitigate power consumption and overhead. The network therefore makes a tradeoff of latency versus power consumption and overhead. However, there is a known or fixed overhead irrespective of the actual load.

Figure 4:
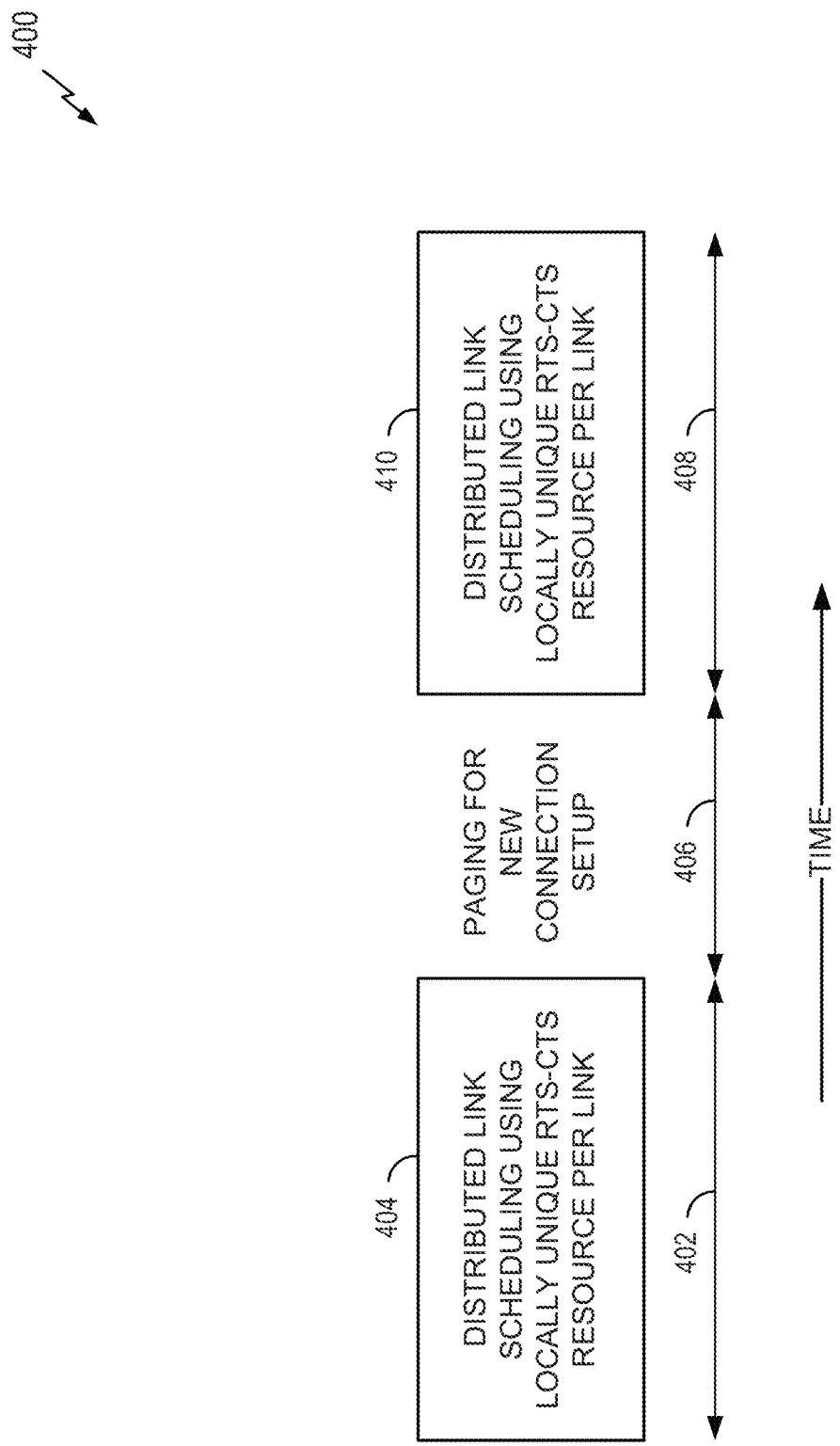
FIG. 4 illustrates an example of paging for a connection setup.

The diagram 400 of FIG. 4 illustrates a simplified example of periodic paging in such a network. During a first time interval 402, devices (not shown) employ distributed link scheduling using a unique RTS-CTS resource per link 404. During a second time interval 406, any of the devices can page for a new connection setup. During a third time interval 408, the devices again employ distributed link scheduling using a unique RTS-CTS resource per link 410.

Some paging-based designs employ a 2-way or 3-way handshake to agree on an RTS-CTS resource to be used for subsequent link scheduling. This RTS-CTS resource may also be referred to as a connection identifier (CID).

Figure 5:
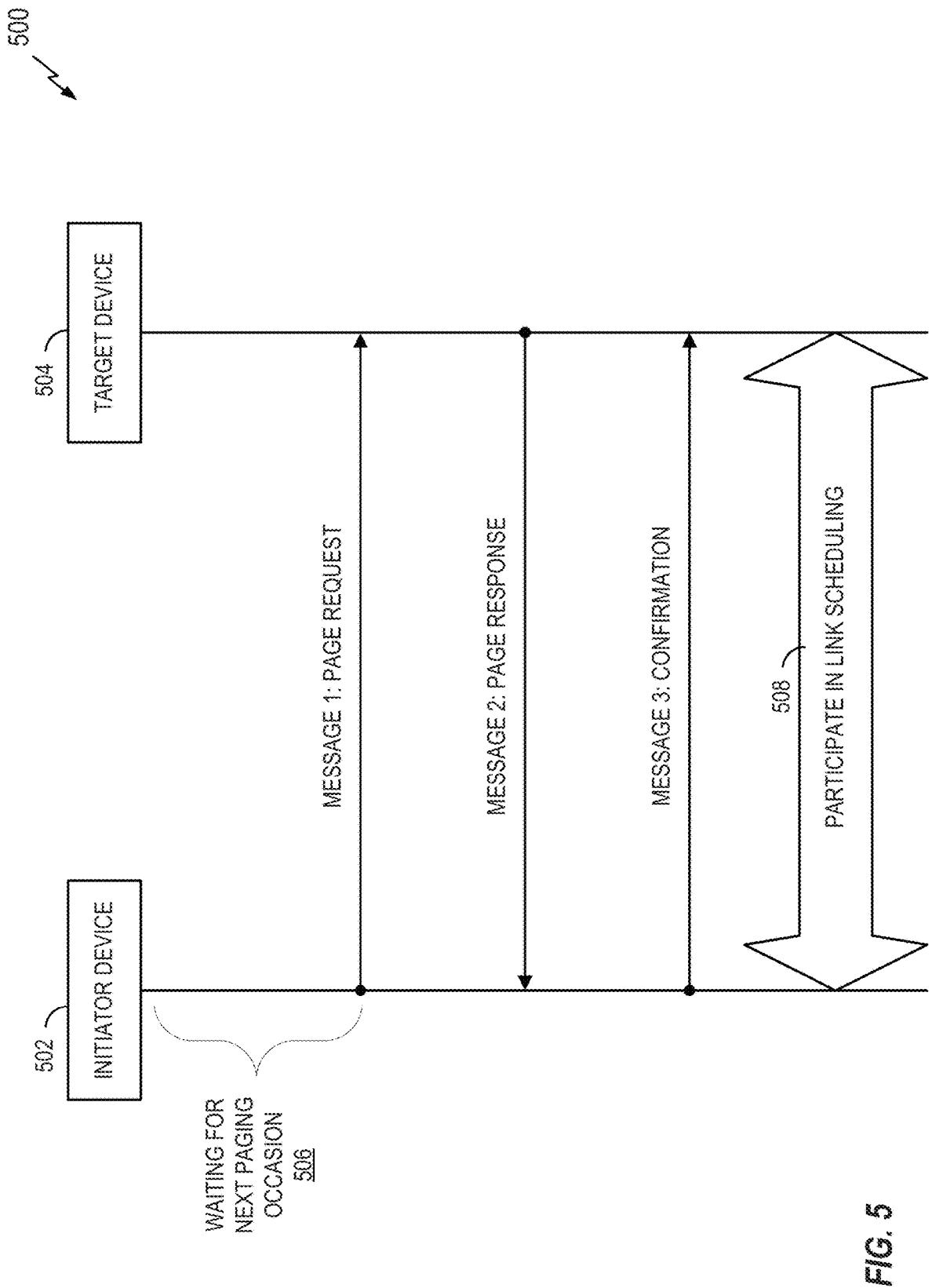
FIG. 5 illustrates an example of paging signaling for a connection setup.

FIG. 5 illustrates an example of signaling for a 3-way handshake 500 between an initiator device 502 and a target device 504. The initiator device 502 waits for the next paging opportunity 506. Once the paging opportunity time arrives, the initiator device 502 sends a first message (Message 1) that includes a page request. Upon receiving the first message, the target device 504 sends a second message (Message 2) that includes a page response. Upon receiving the second message, the initiator device 502 sends a third message (Message 3) that includes a confirmation. The initiator device 502 and the target device 504 may then participate in link scheduling 508.

In conventional periodic designs, there may be contention during paging since devices may need to wait for the paging period to make a new connection. This contention is thinned in stages during subsequent iterations of the paging periods.

Fast PHY Connection Setup and Messaging

The disclosure relates in some aspects to a protocol and signaling scheme to set up a new connection between devices (e.g., nodes) and/or communicate high priority messages between such devices. This scheme employs dynamic connection scheduling for initial access and/or dynamic scheduling for high priority message access. In some implementations, such a scheme could employ conventional 2-way or 3-way handshake messages (e.g., with some modification).

In some implementations, the highest priority RTS-CTS resource is used as a common control channel. An initiator node transmits the highest priority RTS. Each target node that expects to receive the highest priority RTS responds with a corresponding CTS. In this way, a data slot is secured for an initiator-to-target broadcast of a first message (e.g., Message 1).

Such a scheme may provide lower (e.g., zero) latency as compared to periodic paging designs since the targets may continually or frequently listen for RTSs. Such a scheme may also provide lower resource overhead as compared to periodic paging designs since resources can be scheduled only when needed. Furthermore, such a scheme may result in less contention as compared to periodic paging designs since devices need not wait for a paging period to contend for a resource.

Several example aspects of the disclosure will be described with reference to FIGS. 6-9. For purposes of illustration, these figures may illustrate various components in the context of certain technology. It should be appreciated, however, that the teachings herein may employ other types of devices and be implemented using other types of radio technologies and architectures. Also, various operations may be described as being performed by specific types of components (e.g., D2D communication devices, smart devices, eNBs, base stations, client devices, peer-to-peer devices, UEs, and so on). It should be understood that these operations can be performed by other types of devices. To reduce the complexity of these figures, only a few example components are shown. However, the teachings herein can be implemented using a different number of components or other types of components.

Figure 6:
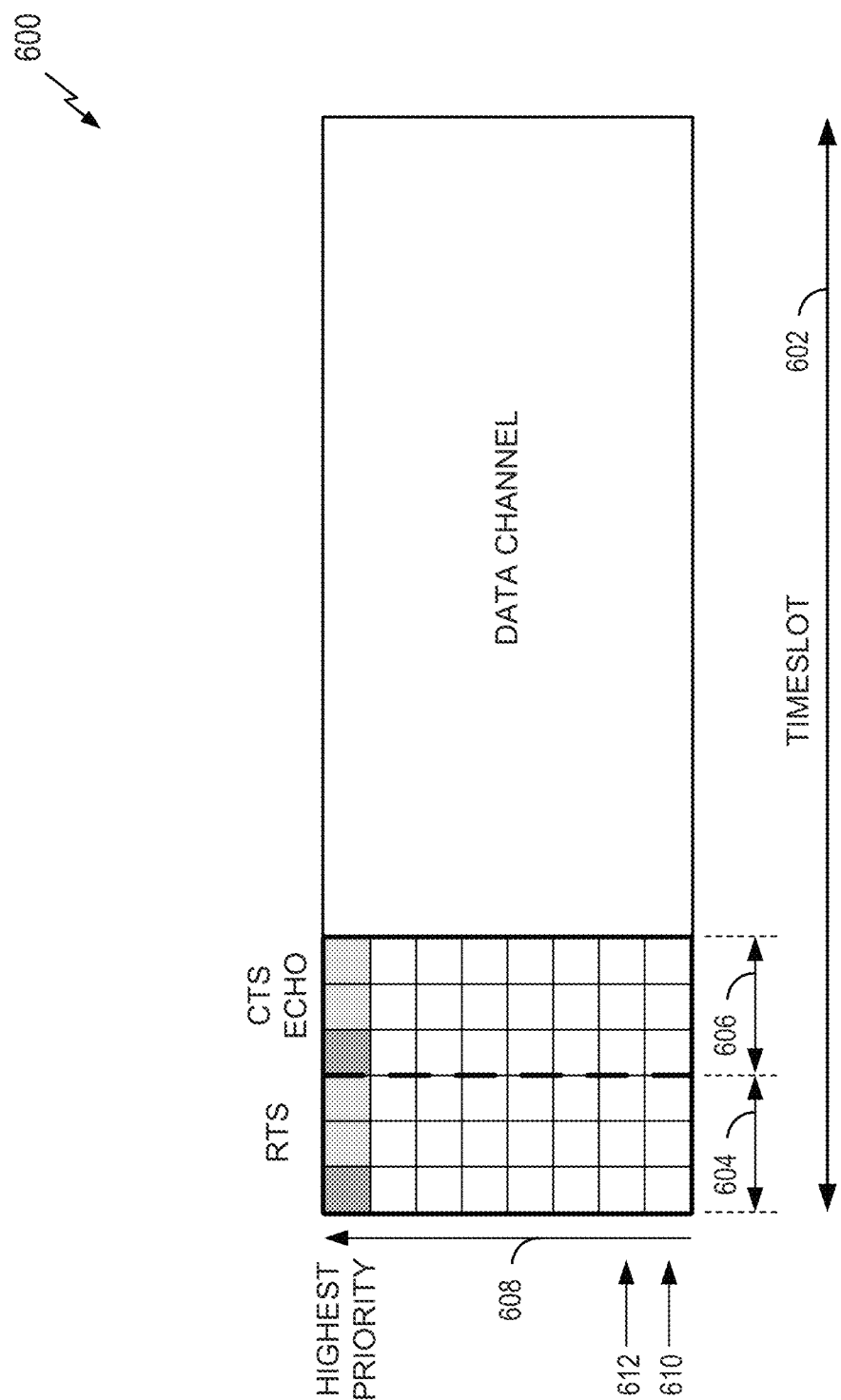
FIG. 6 illustrates an example of a timeslot in accordance with some aspects of the disclosure.

The diagram 600 of FIG. 6 illustrates an example of a structure of a timeslot 602 that may be employed in conjunction with the teachings herein. An RTS is communicated during a first sub-slot 604 of the timeslot 602. A CTS is communicated during a second sub-slot 606 of the timeslot 602. Data is communicated during a data channel designated for the remainder of the timeslot 602.

As indicated by the vertical boxes in FIG. 6, RTS and CTS pairs may be transmitted at different frequencies (y-axis in FIG. 6). Moreover, different frequencies may be associated with different priorities as represented by the arrow 608. For example, the frequencies corresponding to the row 610 may be associated with a lower priority than the frequencies corresponding to the row 612. Thus, as indicated in FIG. 6, a particular RTS-CTS frequency may be designated as the highest priority RTS-CTS resource. Accordingly, any RTS or CTS sent on that resource is considered to be the highest priority RTS or CTS.

Other types of resources may be used for sending and receiving RTS and CTS. For example, and without limitation, such a resource may include different frequencies, different tones (e.g., sinusoids), different tone sequences, different codes, or some combination thereof. Prioritization may be applied to any of these resource types. Thus, in general, the priority of an RTS or CTS may be indicated based on the resource assigned for communication of the RTS or CTS.

Resources (and, hence, RTS signals and CTS signals) can be prioritized relative to one another. As one example, a resource classified as a low priority resource is associated with lower priority than a resource classified as a high priority resource. In different implementations, a different number of priorities (e.g., low priority, medium priority, high priority, and so on) can be defined relative to one another. Classifiers other than low, high, etc., could also be used. For example, a priority 1 resource could have lower priority than a priority 2 resource.

Figure 7:
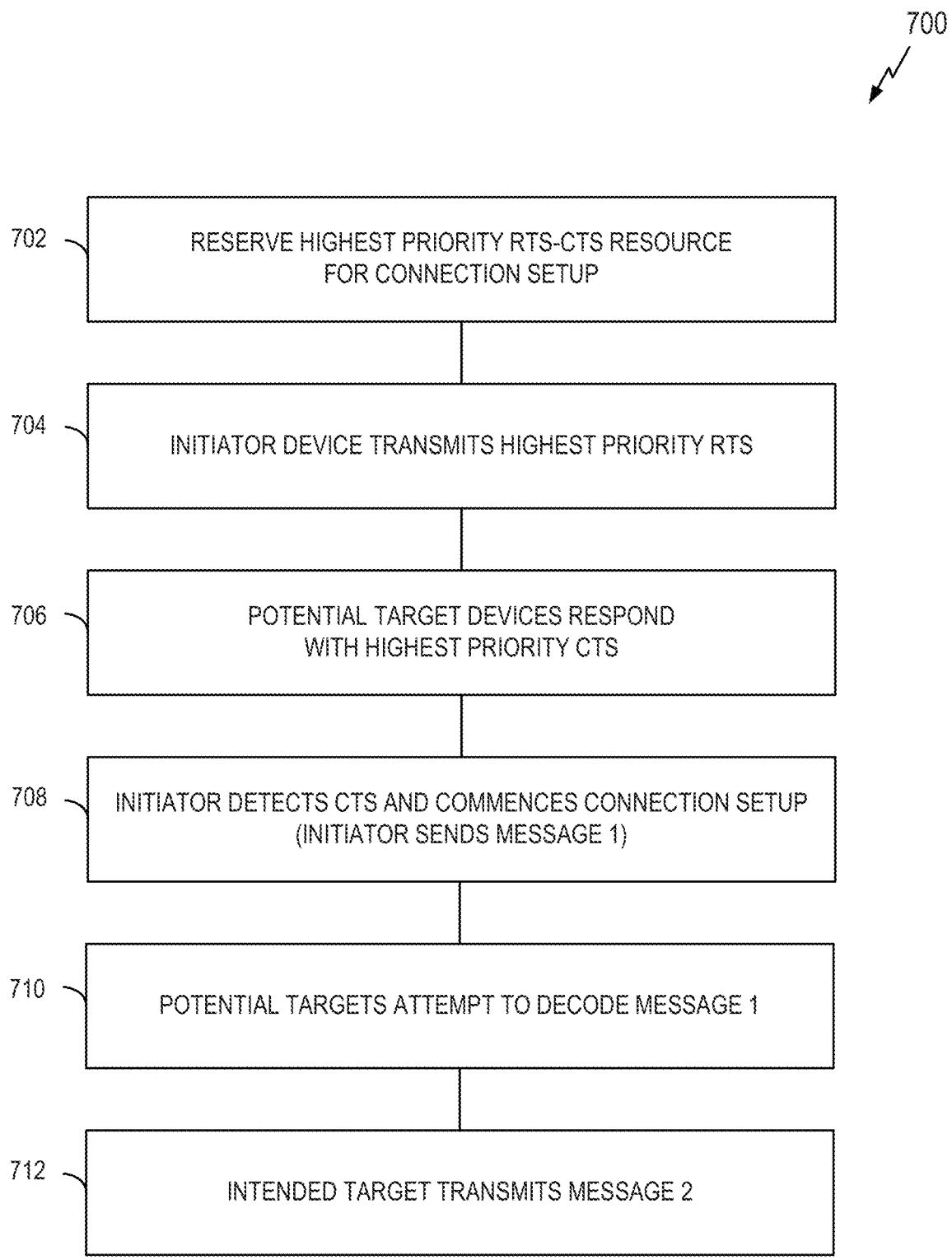
FIG. 7 illustrates an example of a process employing prioritized RTS-CTS resources in accordance with some aspects of the disclosure.
Figure 8:
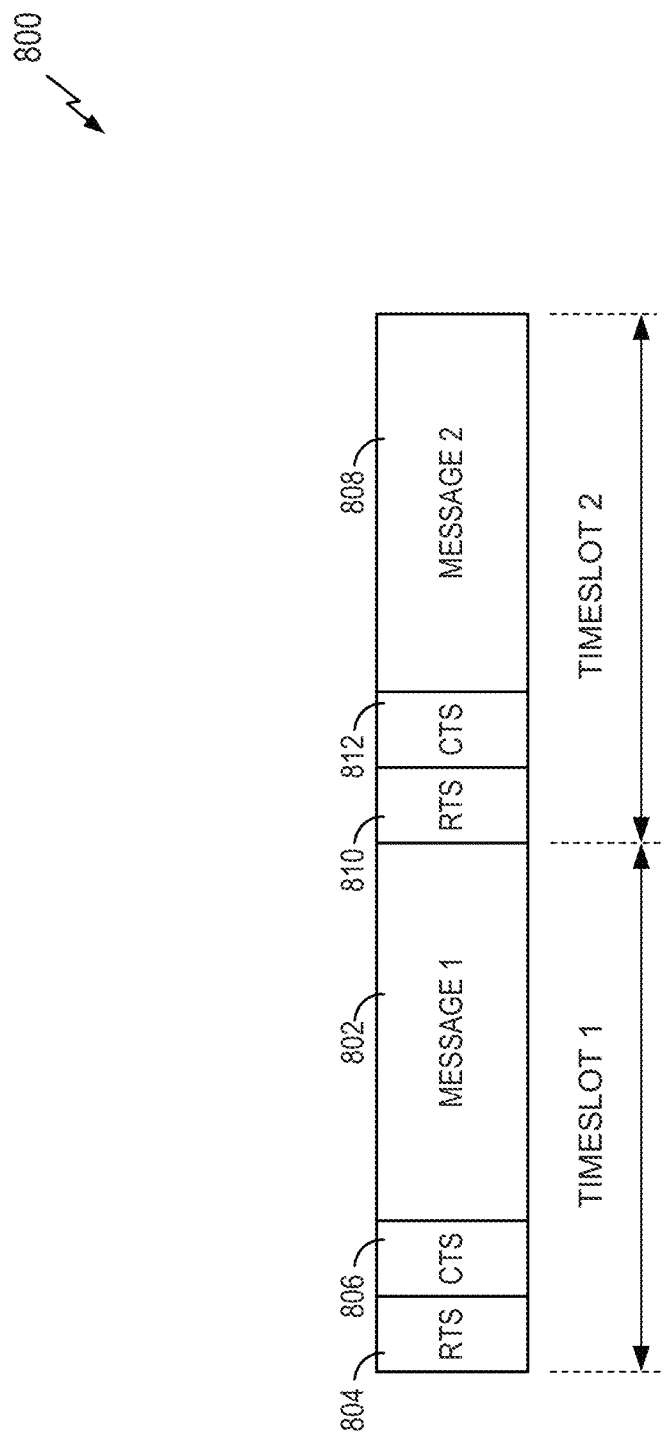
FIG. 8 illustrates an example of timeslots in accordance with the example of FIG. 6.

An example of a process for PHY connection setup and/or random access is described with reference to the flowchart 700 of FIG. 7.

In a first operation 702, the highest priority RTS-CTS resource is reserved for connection setup.

In a second operation 704, an Initiator device (e.g., the device that initiates connection setup with a Target device) transmits this highest priority RTS.

In a third operation 706, all potential Target devices that hear this RTS respond with the corresponding highest priority CTS. This secures the Initiator-to-Target channel for all responding Target devices. Some collision is still possible (and acceptable) if multiple nearby Initiators transmit the RTS/initiate connection setup in the same slot. All potential Target devices are responding at this point because the potential Target devices do not (or might not) know which device is the intended Target.

In a fourth operation 708, the Initiator, upon detecting any CTS, accesses the channel and begins the normal connection setup procedure (e.g., transmits the first connection setup message, Message 1). Message 1 includes an identifier (ID) of the intended Target (e.g., a public ID, a routing area ID, a locally unique ID, or some other type of ID). Message 1 also includes an ID of the Initiator (e.g., a locally unique ID, or some other type of ID). If the IDs are not unique, a 3-way handshake may be employed to ensure that a given node pair is in communication. Message 1 may also include indications (e.g., indices) of one or more (e.g., 1-3) RTS-CTS resource pairs (or CIDs) that the Initiator is proposing to use for the new connection. These proposed RTS-CTS resources can be the resources that are unoccupied in the vicinity of the Initiator (e.g., based on the Initiator's local measurements) and hence available for any new links in this area.

In a fifth operation 710, each potential Target that sent a CTS in the third operation 706 tries to decode Message 1 to see if it is the intended Target. If the intended Target (e.g., the Target corresponding to a Target ID contained in Message 1) successfully decodes Message 1, this device will respond with Message 2 of the handshake.

Thus, in a sixth operation 712, the intended Target transmits Message 2. Message 2 contains IDs of the Initiator and Target and, optionally, an indication (e.g., index) of the RTS-CTS resource (or CID) accepted or proposed by the Target. To transmit Message 2 (Target-to-Initiator), any of the three example options that follow may be employed.

Option 1: Subsequent timeslot. The Target transmits Message 2 in the subsequent timeslot using the same method used by the Initiator to transmit Message 1. That is, the Target transmits the highest priority RTS. All potential Targets devices as well as the Initiator respond with a CTS, thus securing the Target-to-Initiator channel (as well as needlessly securing a Target-to-potential Targets channel). An example of this option is shown in the diagram 800 of FIG. 8 where a first message 802 (Message 1) is sent in a timeslot 1 following a first RTS 804 and a first CTS 806; and a second message 808 (Message 2) is sent in a timeslot 2 following a second RTS 810 and a second CTS 812.

As an alternative in case of RTS-CTS resource (or CID) agreement, the Target can contend for the Data channel using one of the RTS-CTS resources (or CIDs) proposed by the Initiator in Message 1. The Initiator responds to the RTS heard on all feasible proposed RTS-CTS resources (or CIDs). The Target gets to transmit Message 2 when the agreed RTS-CTS resource (or CID) has the highest priority in the neighborhood.

Option 2: Same timeslot. In this case, Message 1 is contained in the first part of the timeslot and Message 2 is transmitted in the second part of the timeslot (with a small gap, e.g., 10 μs, in between for TX-RX turnaround). To use this method, the Target-to-Initiator channel is secured for Message 2 by modifying the third operation so that the Initiator joins all potential Targets in transmitting the highest priority CTS.

Figure 9:
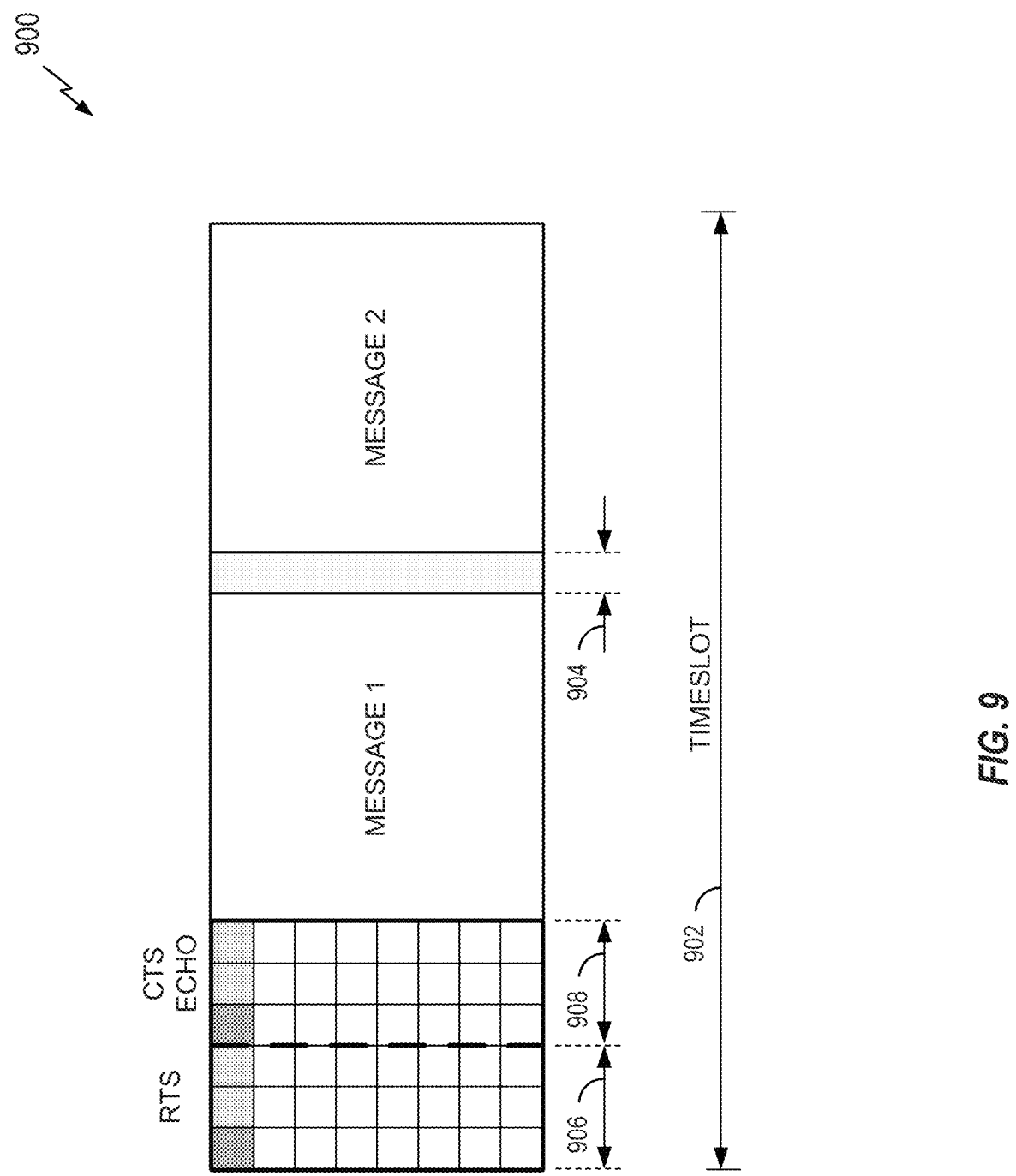
FIG. 9 illustrates another example of a timeslot in accordance with some aspects of the disclosure.

An example of this option is shown in the diagram 900 of FIG. 9 where Message 1 and Message 2 are sent in the same timeslot 902. Within a given slot, bidirectional protection (not offered by conventional RTS-CTS) may be employed as indicated by a time gap 904 (e.g., 10 μs in some implementations). The Initiator transmits both RTS and CTS (self-CTS) during the sub-slots 906 and 908, respectively. In the next timeslot (not shown in FIG. 9), the highest priority CID is again used.

Figure 10:
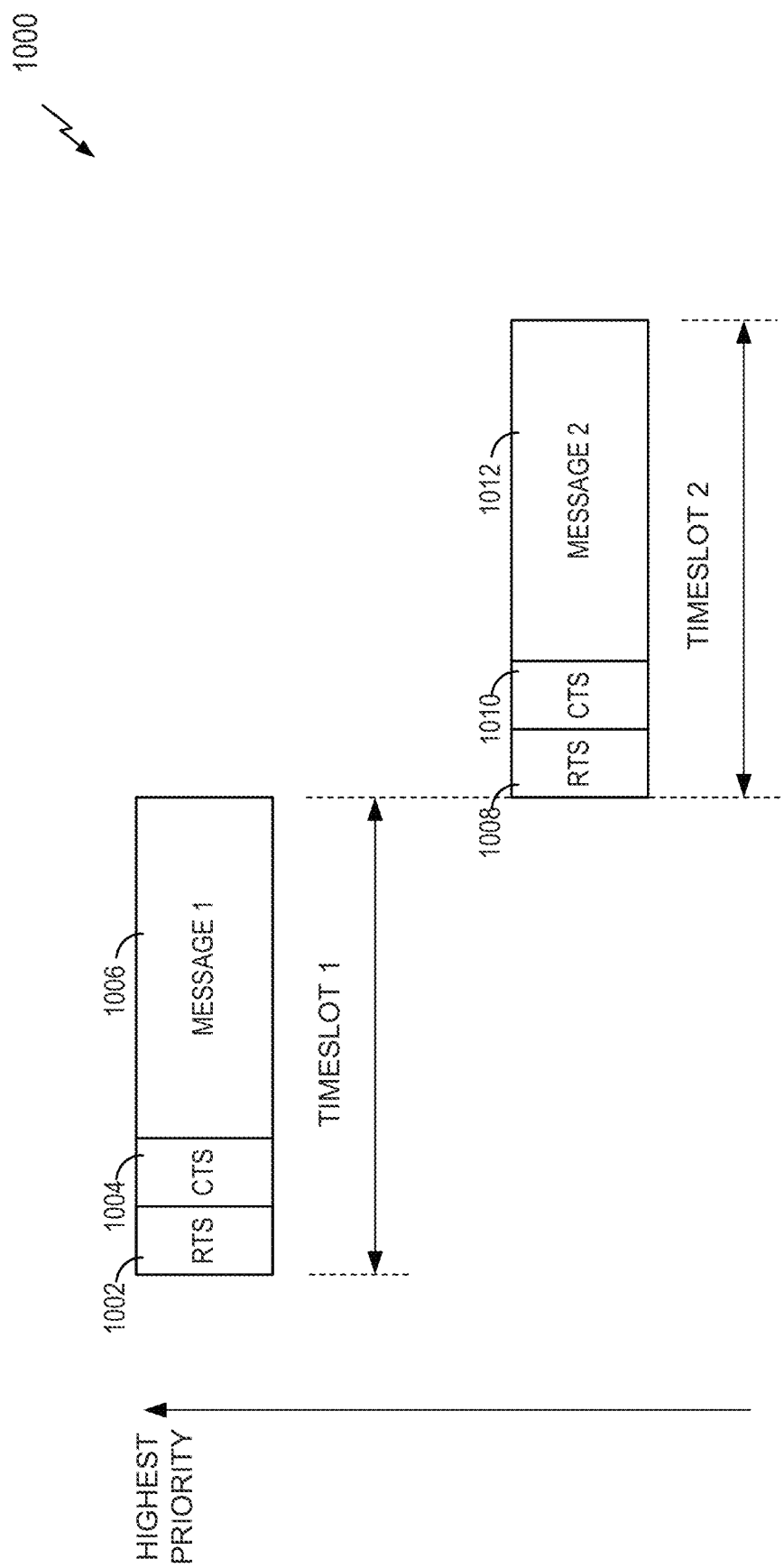
FIG. 10 illustrates another example of timeslots in accordance with some aspects of the disclosure.

Option 3: Using one of the RTS-CTS resources proposed in Message 1. The Target starts participating in link scheduling using one of the proposed RTS resources, and the Initiator starts to respond (with CTSs) to RTSs heard on any of the resources it proposed. The Target transmits Message 2 when it wins the channel using the RTS-CTS resource. An example of this option is shown in the diagram 1000 of FIG. 10. In timeslot 1, a first RTS 1002, a first CTS 1004, and a first message 1006 (Message 1) are communicated via a highest priority RTS-CTS resource. The first message 1006 includes an indication (not shown) of at least one RTS-CTS resource to be used for setting up a connection. In timeslot 2, a second RTS 1008, a second CTS 1010, and a second message 1012 (Message 2) are communicated via an RTS-CTS resource specified in message 1.

Several example modifications of the above scheme are set forth below.

The RTS may include a partial ID of the intended receiver node, thereby reducing the number of devices that would needlessly respond with the CTS. For example, in block 1704 of the process 1700 described below, the RTS may include a partial ID of the intended Target. Subsequently, in block 1904 of the process 1900 described below, a device may send the CTS if the partial ID found in the RTS received in block 1902 matches that of the device.

Target devices that are configured for connection setup need not be listening all the time. That is, each Target device might listen only on a subset of timeslots. The subset may be derivable from the Target device ID so that the Initiator device knows when to start the procedure.

Instead of just one highest priority RTS-CTS resource pair reserved for connection setup, the top N>1 highest priority resources can be reserved for this purpose. Initiators can select one of these resources at random (or based on some other algorithm). An Initiator can select a resource based on the Target ID (e.g., each Target listens and responds on one of the N resources).

N≥1 RTS resource(s) may be used while only 1 CTS resource is used. The Initiator can select the RTS resource based on the Target ID, thereby reducing the number of the Targets that would respond on the CTS resource.

The highest priority RTS-CTS resources need not be exclusively reserved for connection setup. Rather, these RTS-CTS resources can be used for any high priority messages (e.g., "broadcast" messages) sent to the set of nodes that are configured to respond with a CTS to these RTSs.

Figure 11:
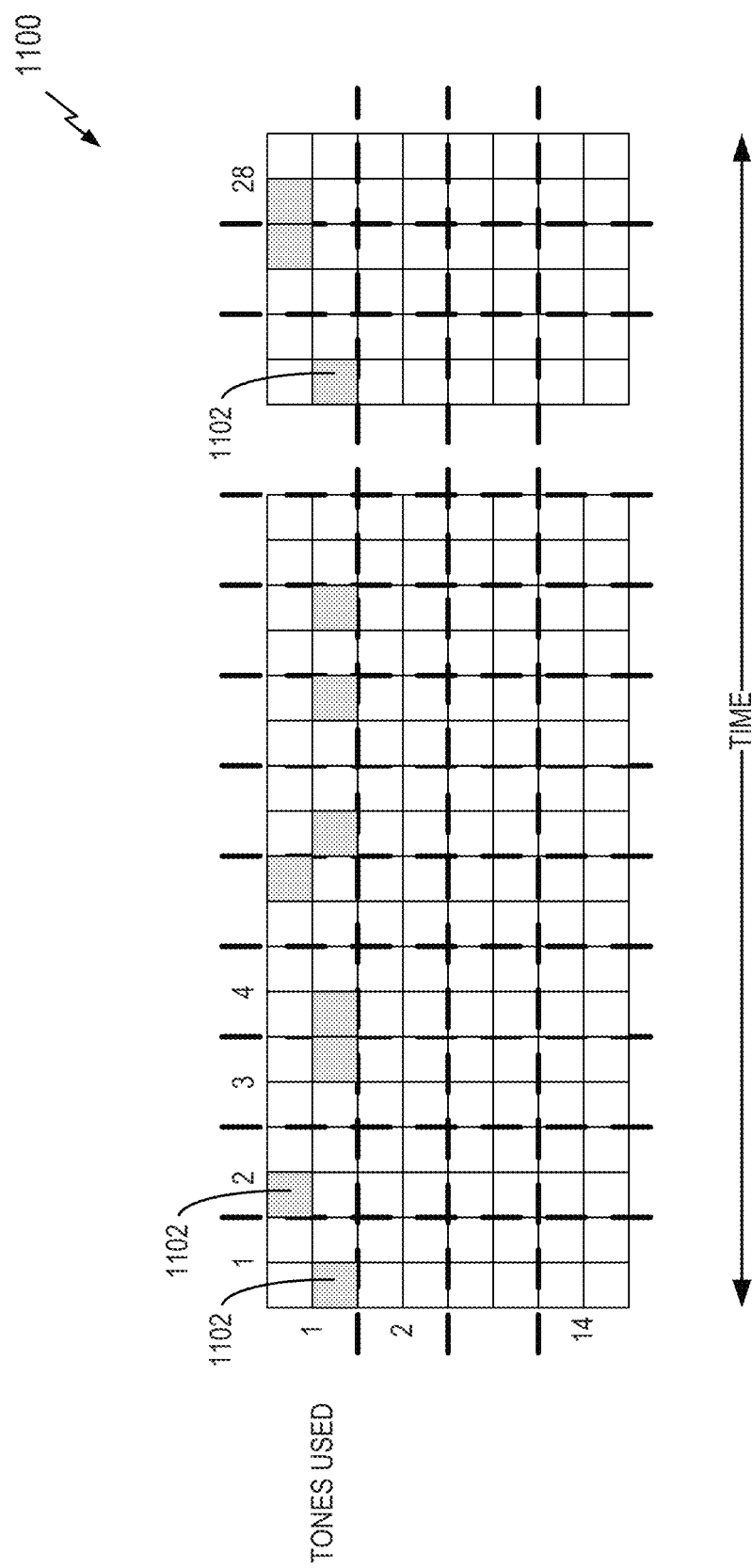
FIG. 11 illustrates an example of modulation in accordance with some aspects of the disclosure.

Referring now to FIG. 11, in some aspects, robust modulation for connection setup messages is provided to mitigate potential collisions. For example, as shown in the diagram 1100, transmissions that are sparse in time may be used as represented by the relative scarcity of the shaded blocks (e.g., blocks 1102) indicating which tones are being used. Also, a few bits of the Target ID could be used to choose the subset of symbols within which the transmission is to occur.

First Example Apparatus

Figure 12:
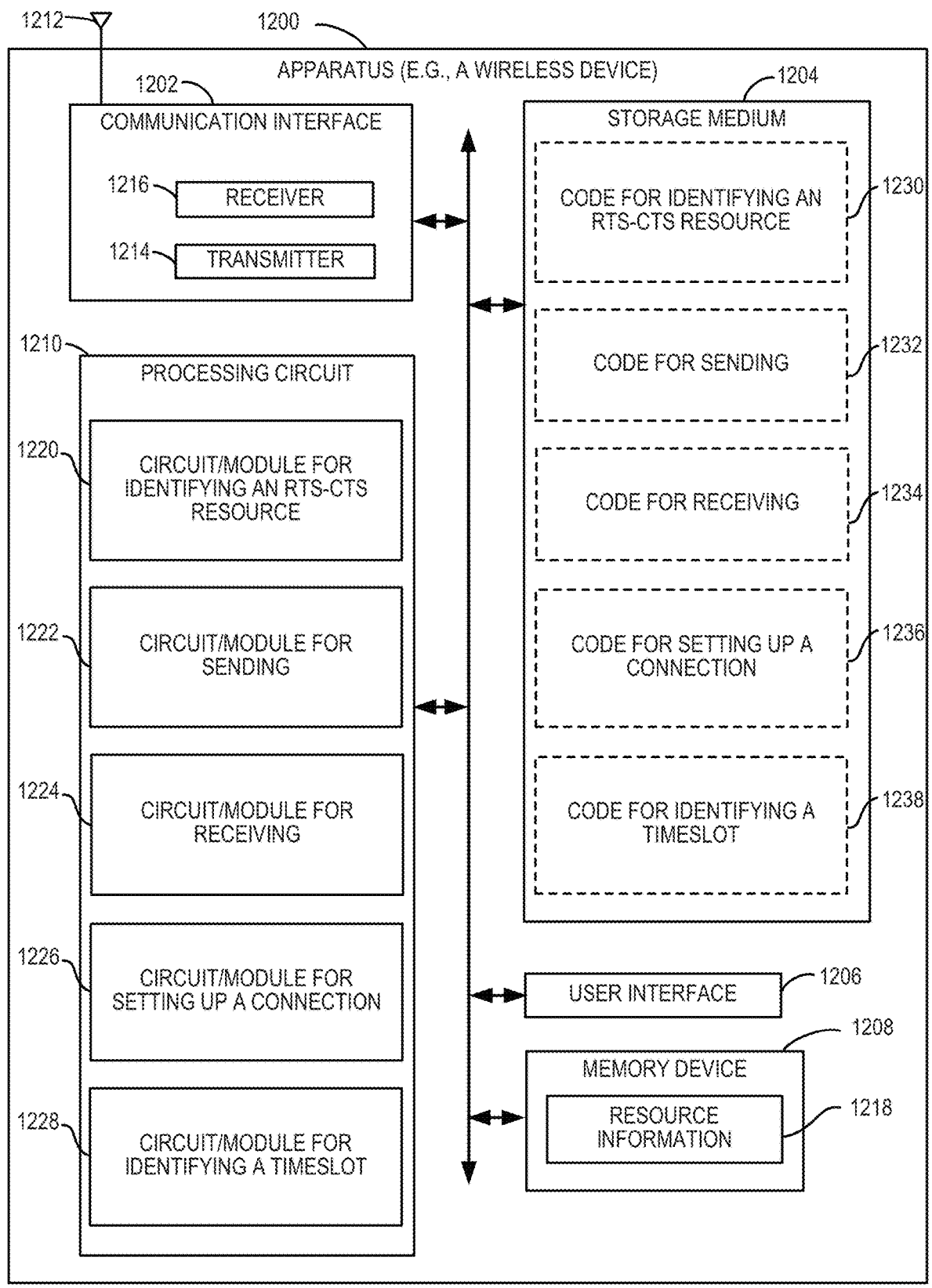
FIG. 12 illustrates a block diagram of an example hardware implementation for an apparatus (e.g., an electronic device) that can employ prioritized RTS-CTS resources in accordance with some aspects of the disclosure.

FIG. 12 is an illustration of an apparatus 1200 that may support prioritized RTS-CTS resources according to one or more aspects of the disclosure. The apparatus 1200 could embody or be implemented within a device that supports D2D communication, a UE, an eNB, or some other type of device that supports wireless communication. In various implementations, the apparatus 1200 could embody or be implemented within an access terminal, an access point, or some other type of device. In various implementations, the apparatus 1200 could embody or be implemented within a mobile phone, a smart phone, a tablet, a portable computer, a server, a personal computer, a sensor, an entertainment device, a medical device, or any other electronic device having circuitry. The apparatus 1200 includes a communication interface (e.g., at least one transceiver) 1202, a storage medium 1204, a user interface 1206, a memory device 1208, and a processing circuit 1210.

These components can be coupled to and/or placed in electrical communication with one another via a signaling bus or other suitable component, represented generally by the connection lines in FIG. 12. The signaling bus may include any number of interconnecting buses and bridges depending on the specific application of the processing circuit 1210 and the overall design constraints. The signaling bus links together various circuits such that each of the communication interface 1202, the storage medium 1204, the user interface 1206, and the memory device 1208 are coupled to and/or in electrical communication with the processing circuit 1210. The signaling bus may also link various other circuits (not shown) such as timing sources, peripherals, voltage regulators, and power management circuits, which are well known in the art, and therefore, will not be described any further.

The communication interface 1202 may be adapted to facilitate wireless communication of the apparatus 1200. For example, the communication interface 1202 may include circuitry and/or programming adapted to facilitate the communication of information bi-directionally with respect to one or more communication devices in a network. In some implementations, the communication interface 1202 may be configured for wire-based communication. In some implementations, the communication interface 1202 may be coupled to one or more antennas 1212 for wireless communication within a wireless communication system. The communication interface 1202 can be configured with one or more standalone receivers and/or transmitters, as well as one or more transceivers. In the illustrated example, the communication interface 1202 includes a transmitter 1214 and a receiver 1216.

The memory device 1208 may represent one or more memory devices. As indicated, the memory device 1208 may maintain resource-related information 1218 along with other information used by the apparatus 1200. In some implementations, the memory device 1208 and the storage medium 1204 are implemented as a common memory component. The memory device 1208 may also be used for storing data that is manipulated by the processing circuit 1210 or some other component of the apparatus 1200.

The storage medium 1204 may represent one or more computer-readable, machine-readable, and/or processor-readable devices for storing programming, such as processor executable code or instructions (e.g., software, firmware), electronic data, databases, or other digital information. The storage medium 1204 may also be used for storing data that is manipulated by the processing circuit 1210 when executing programming. The storage medium 1204 may be any available media that can be accessed by a general purpose or special purpose processor, including portable or fixed storage devices, optical storage devices, and various other mediums capable of storing, containing or carrying programming.

By way of example and not limitation, the storage medium 1204 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1204 may be embodied in an article of manufacture (e.g., a computer program product). By way of example, a computer program product may include a computer-readable medium in packaging materials. In view of the above, in some implementations, the storage medium 1204 may be a non-transitory (e.g., tangible) storage medium.

The storage medium 1204 may be coupled to the processing circuit 1210 such that the processing circuit 1210 can read information from, and write information to, the storage medium 1204. That is, the storage medium 1204 can be coupled to the processing circuit 1210 so that the storage medium 1204 is at least accessible by the processing circuit 1210, including examples where at least one storage medium is integral to the processing circuit 1210 and/or examples where at least one storage medium is separate from the processing circuit 1210 (e.g., resident in the apparatus 1200, external to the apparatus 1200, distributed across multiple entities, etc.).

Programming stored by the storage medium 1204, when executed by the processing circuit 1210, causes the processing circuit 1210 to perform one or more of the various functions and/or process operations described herein. For example, the storage medium 1204 may include operations configured for regulating operations at one or more hardware blocks of the processing circuit 1210, as well as to utilize the communication interface 1202 for wireless communication utilizing their respective communication protocols.

The processing circuit 1210 is generally adapted for processing, including the execution of such programming stored on the storage medium 1204. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1210 is arranged to obtain, process and/or send data, control data access and storage, issue commands, and control other desired operations. The processing circuit 1210 may include circuitry configured to implement desired programming provided by appropriate media in at least one example. For example, the processing circuit 1210 may be implemented as one or more processors, one or more controllers, and/or other structure configured to execute executable programming. Examples of the processing circuit 1210 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1210 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1210 are for illustration and other suitable configurations within the scope of the disclosure are also contemplated.

According to one or more aspects of the disclosure, the processing circuit 1210 may be adapted to perform any or all of the features, processes, functions, operations and/or routines for any or all of the apparatuses described herein. For example, the processing circuit 1210 may be configured to perform any of the steps, functions, and/or processes described with respect to FIGS. 1-11 and 13. As used herein, the term "adapted" in relation to the processing circuit 1210 may refer to the processing circuit 1210 being one or more of configured, employed, implemented, and/or programmed to perform a particular process, function, operation and/or routine according to various features described herein.

The processing circuit 1210 may be a specialized processor, such as an application specific integrated circuit (ASIC) that serves as a means for (e.g., structure for) carrying out any one of the operations described in conjunction with FIGS. 1-11 and 13. The processing circuit 1210 may serve as one example of a means for transmitting and/or a means for receiving.

According to at least one example of the apparatus 1200, the processing circuit 1210 may include one or more of a circuit/module for identifying an RTS-CTS resource 1220, a circuit/module for sending 1222, a circuit/module for receiving 1224, a circuit/module for setting up a connection 1226, or a circuit/module for identifying a timeslot 1228.

The circuit/module for identifying an RTS-CTS resource 1220 may include circuitry and/or programming (e.g., code for identifying an RTS-CTS resource 1230 stored on the storage medium 1204) adapted to perform several functions relating to, for example, identifying an RTS-CTS resource from a plurality of prioritized RTS-CTS resources. Initially, the circuit/module for identifying an RTS-CTS resource 1220 obtains information about the prioritized RTS-CTS resources. For example, the circuit/module for identifying an RTS-CTS resource 1220 may obtain a list of these resources from the memory device 1208. The circuit/module for identifying an RTS-CTS resource 1220 processes the obtained information to identify the highest priority RTS-CTS resource (e.g., by comparing priority information indicated in the list for each resource). For example different frequency bands (or timeslots, etc.) for RTS-CTS communication may be associated with different priority values. The circuit/module for identifying an RTS-CTS resource 1220 then outputs an indication of the identified RTS-CTS resource to a component of the apparatus 1200 (e.g., to the memory device 1208, the communication interface 1202, the circuit/module for sending 1222, the circuit module for receiving 1224, or some other component).

The circuit/module for sending 1222 may include circuitry and/or programming (e.g., code for sending 1232 stored on the storage medium 1204) adapted to perform several functions relating to, for example, sending information (e.g., data) to another apparatus. Initially, the circuit/module for sending 1222 obtains the information to be sent (e.g., from the memory device 1208, or some other component). In various implementations, the information to be sent may include an RTS, a CTS, or a message. The circuit/module for sending 1222 may then format the information for sending (e.g., in a message, according to a protocol, etc.). The circuit/module for sending 1222 then causes the information to be sent via a wireless communication medium (e.g., via D2D signaling). To this end, the circuit/module for sending 1222 may send the data to the transmitter 1214 or some other component for transmission. In some implementations, the transmitter 1214 includes or embodies the circuit/module for sending 1222 and/or include the code for sending 1232.

The circuit/module for receiving 1224 may include circuitry and/or programming (e.g., code for receiving 1234 stored on the storage medium 1204) adapted to perform several functions relating to, for example, receiving information (e.g., data) from another apparatus. In various implementations, the information to be received may include an RTS, a CTS, or a message. Initially, the circuit/module for receiving 1224 obtains received information. For example, the circuit/module for receiving 1224 may obtain this information from a component of the apparatus 1200 (e.g., the receiver 1216, the memory device 1208, or some other component) or directly from a device (e.g., a D2D device) that transmitted the information. In some implementations, the circuit/module for receiving 1224 identifies a memory location of a value in the memory device 1208 and invokes a read of that location to receive the information. In some implementations, the circuit/module for receiving 1224 processes (e.g., decodes) the received information. The circuit/module for receiving 1224 outputs the received information (e.g., stores the received information in the memory device 1208 or sends the information to another component of the apparatus 1200). In some implementations, the receiver 1216 includes or embodies the circuit/module for receiving 1224 and/or includes the code for receiving 1234.

The circuit/module for setting up a connection 1226 may include circuitry and/or programming (e.g., code for setting up a connection 1226 stored on the storage medium 1204) adapted to perform several functions relating to, for example, setting up a connection between a first apparatus and a second apparatus. In some implementations, the circuit/module for setting up a connection 1226 generates a first message as a result of the apparatus 1200 receiving a first CTS. This message may indicate one or more RTS-CTS resources to be used for subsequent communication between the apparatuses. In some implementations, the circuit/module for setting up a connection 1226 exchanges parameters (e.g., frequency band, QoS parameters, hybrid automatic repeat request (HARQ) parameters, etc.) to be used for the connection with another apparatus. In some implementations, the circuit/module for setting up a connection 1226 communicates via D2D signaling (e.g., as in FIG. 5) to establish the connection.

The circuit/module for identifying a timeslot 1228 may include circuitry and/or programming (e.g., code for identifying a timeslot 1238 stored on the storage medium 1204) adapted to perform several functions relating to, for example, identifying a timeslot that is associated with a target device. Initially, the circuit/module for identifying a timeslot 1228 obtains information about the target device. In some implementations, the circuit/module for identifying a timeslot 1228 obtains a device identifier from the memory device 1208 (e.g., identifying a device to which data is to be sent or from which data is to be received). In some implementations, the circuit/module for identifying a timeslot 1228 executes a function (e.g., a hash algorithm) using the device identifier as an input to generate a list of one or more timeslots corresponding to the device. In other implementations, the circuit/module for identifying a timeslot 1228 obtains information associated with this device identifier from the memory device 1208 (e.g., matching the identifier with a list of timeslots corresponding to the device). The circuit/module for identifying a timeslot 1228 then outputs an indication of the identified timeslot(s) to a component of the apparatus 1200 (e.g., to the memory device 1208, the communication interface 1202, the circuit/module for sending 1222, the circuit module for receiving 1224, or some other component).

As mentioned above, programming stored by the storage medium 1204, when executed by the processing circuit 1210, causes the processing circuit 1210 to perform one or more of the various functions and/or process operations described herein. For example, the storage medium 1204 may include one or more of the code for identifying an RTS-CTS resource 1230, the code for sending 1232, the code for receiving 1234, the code for setting up a connection 1236, or the code for identifying a timeslot 1238.

First Example Process

Figure 13:
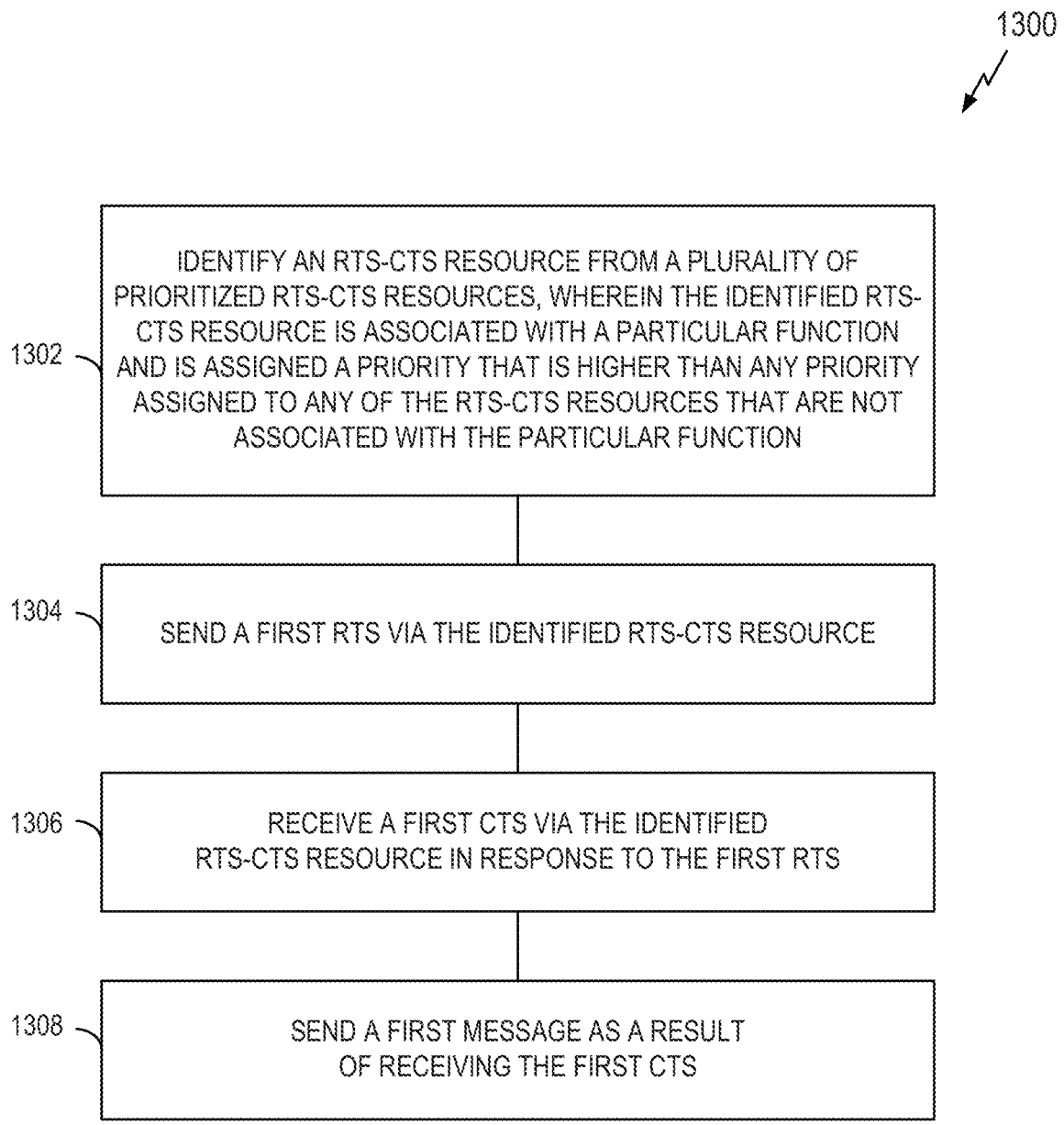
FIG. 13 illustrates an example of a process employing prioritized RTS-CTS resources in accordance with some aspects of the disclosure.

FIG. 13 illustrates a process 1300 for supporting communication in accordance with some aspects of the disclosure. The process 1300 may take place within a processing circuit (e.g., the processing circuit 1210 of FIG. 12), which may be located in a device that supports D2D communication, an access terminal, a base station, or some other suitable apparatus. In some aspects, the process 1300 may take place within a node that is initiating communication. Of course, in various aspects within the scope of the disclosure, the process 1300 may be implemented by any suitable apparatus capable of supporting operations that employ prioritized RTS-CTS resources.

In some aspects, the process 1300 may involve communication where request-to-send and clear-to-send (RTS-CTS) resources are prioritized. For example, different RTS-CTS resource may be defined as being either a high priority RTS-CTS resource or a low priority RTS-CTS resource. In some aspects, the RTS-CTS resources may include at least one of: a frequency tone, a sequence of frequency tones, a frequency band, or an orthogonal code. In some aspects, the prioritized RTS-CTS resources may be associated with different functions.

At block 1302, an apparatus (e.g., a D2D device) identifies an RTS-CTS resource from a plurality of prioritized RTS-CTS resources. The identified resource may be associated with a particular function. In addition, the identified resource may be assigned a priority that is higher than any priority assigned to any of the RTS-CTS resources that are not associated with the particular function.

In some aspects, the particular function may include setting up a connection and/or broadcasting a type of message having a higher priority than other types of messages. In some aspects, an RTS-CTS resource that is not associated with the particular function may be associated with a particular apparatus (e.g., a particular wireless communication device). In some aspects, an RTS-CTS resource that is not associated with the particular function may be associated with a particular link (e.g., a particular wireless communication link between two wireless communication devices). In some aspects, an RTS-CTS resource that is not associated with the particular function may be associated with a connection that is already set up.

In some aspects, the RTS-CTS resources include a highest priority RTS-CTS resource. In this case, the identification of the RTS-CTS resource may include selecting the highest priority RTS-CTS resource.

In some aspects, a first plurality of the RTS-CTS resources are defined as having a higher priority than a second plurality of the RTS-CTS resources. In this case, the identification of the RTS-CTS resource may involve selecting one of the first plurality of RTS-CTS resources.

At block 1304, the apparatus sends a first RTS via the identified RTS-CTS resource. In some aspects, the first RTS might not be directed to a particular apparatus (e.g., wireless communication device). For example, a receiver address (RA) included in the first RTS may indicate that the first RTS is being broadcast. Thus, in this case, the RA might not include an address of any particular receiver.

At block 1306, the apparatus receives a first CTS via the identified RTS-CTS resource in response to the first RTS. For example, at least one CTS may be received from any apparatuses that are waiting for a connection setup (e.g., devices that are expecting to send or receive packets).

At block 1308, the apparatus sends a first message as a result of receiving the first CTS. In some aspects, the first message is to set up a connection between a first apparatus and a second apparatus. In some aspects, the first message comprises an identifier of the first apparatus and an identifier of the second apparatus. In some aspects, the first message is a type of broadcast message that is associated with a higher priority than other broadcast messages.

In some aspects, the first message is for communication with a target apparatus. In this case, the identification of the RTS-CTS resource may involve identifying one of the RTS-CTS resources that is associated with the target apparatus. In addition or alternatively, the process 1300 may further include identifying a timeslot that is associated with the target apparatus and sending the first RTS during the identified timeslot.

In some aspects, the process 1300 further includes receiving a second RTS via the identified RTS-CTS resource;

sending a second CTS in response to the second RTS; and receiving a second message in response to the second CTS. In some aspects, the first RTS, the first CTS, and the first message may be communicated during a first timeslot; and the second RTS, the second CTS, and the second message may be communicated during a second timeslot that follows (e.g., immediately follows) the first timeslot.

In some aspects, the first message indicates (e.g., includes an identifier of) at least one RTS-CTS resource. In this case, the process 1300 may further include receiving a second RTS via one of the indicated at least one RTS-CTS resource.

In some aspects, the process 1300 further includes receiving a second message in response to the first message. In this case, the first RTS, the first CTS, the first message, and the second message may be communicated during a single timeslot. In some aspects, the first RTS is sent during a first sub-slot of the timeslot; and the first CTS is received (or is assumed to have been received) during a second sub-slot of the timeslot. In this case, the process 1300 may further include sending a second CTS (e.g., a self-CTS) during the second sub-slot.

In some aspects, the first message is for communication with a target apparatus. In this case, the process 1300 may further include identifying a timeslot that is associated with the target apparatus, whereby the first RTS is sent during the identified timeslot.

Second Example Apparatus

Figure 14:
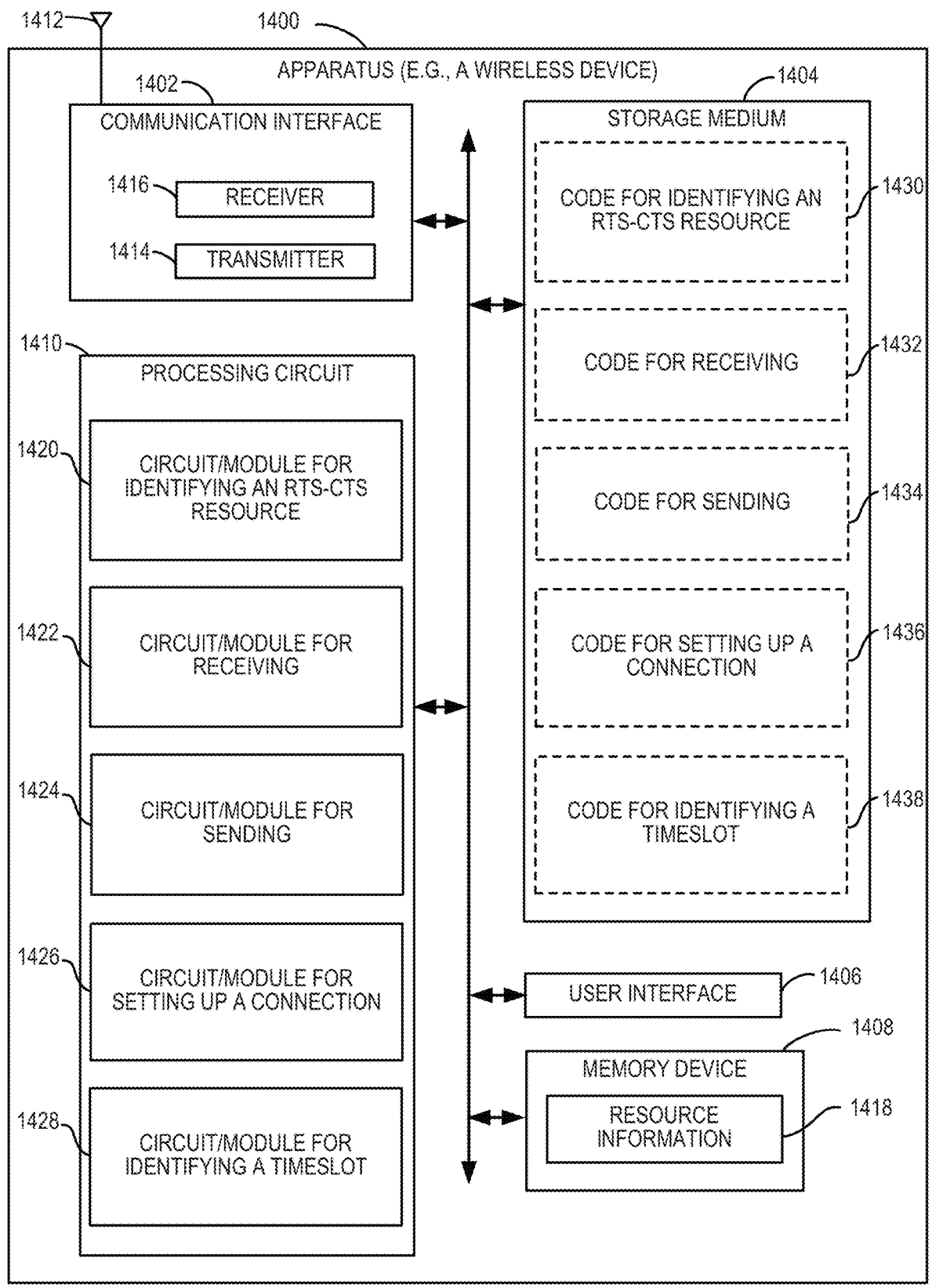
FIG. 14 illustrates a block diagram of an example hardware implementation for another apparatus (e.g., an electronic device) that can employ prioritized RTS-CTS resources in accordance with some aspects of the disclosure.

FIG. 14 illustrates a block diagram of an example hardware implementation of an apparatus 1400 configured to communicate according to one or more aspects of the disclosure. For example, the apparatus 1400 could embody or be implemented within a device that supports D2D communication, a UE, an eNB, or some other type of device that supports wireless communication. In various implementations, the apparatus 1400 could embody or be implemented within an access terminal, an access point, or some other type of device. In various implementations, the apparatus 1400 could embody or be implemented within a mobile phone, a smart phone, a tablet, a portable computer, a server, a personal computer, a sensor, an entertainment device, a medical device, or any other electronic device having circuitry.

The apparatus 1400 includes a communication interface (e.g., at least one transceiver) 1402, a storage medium 1404, a user interface 1406, a memory device 1408 (e.g., storing resource-related information 1418), and a processing circuit (e.g., at least one processor) 1410. In various implementations, the user interface 1406 may include one or more of: a keypad, a display, a speaker, a microphone, a touchscreen display, of some other circuitry for receiving an input from or sending an output to a user. The communication interface 1402 may be coupled to one or more antennas 1412, and may include a transmitter 1414 and a receiver 1416. In general, the components of FIG. 14 may be similar to corresponding components of the apparatus 1200 of FIG. 12.

According to one or more aspects of the disclosure, the processing circuit 1410 may be adapted to perform any or all of the features, processes, functions, operations and/or routines for any or all of the apparatuses described herein. For example, the processing circuit 1410 may be configured to perform any of the steps, functions, and/or processes described with respect to FIGS. 1-11 and 15. As used herein, the term "adapted" in relation to the processing circuit 1410 may refer to the processing circuit 1410 being one or more of configured, employed, implemented, and/or programmed to perform a particular process, function, operation and/or routine according to various features described herein.

The processing circuit 1410 may be a specialized processor, such as an application specific integrated circuit (ASIC) that serves as a means for (e.g., structure for) carrying out any one of the operations described in conjunction with FIGS. 1-11 and 15. The processing circuit 1410 may serve as one example of a means for transmitting and/or a means for receiving.

According to at least one example of the apparatus 1400, the processing circuit 1410 may include one or more of a circuit/module for identifying an RTS-CTS resource 1420, a circuit/module for receiving 1422, a circuit/module for sending 1424, a circuit/module for setting up a connection 1426, or a circuit/module for identifying a times lot 1428.

The circuit/module for identifying an RTS-CTS resource 1420 may include circuitry and/or programming (e.g., code for identifying an RTS-CTS resource 1430 stored on the storage medium 1404) adapted to perform several functions relating to, for example, identifying an RTS-CTS resource from a plurality of prioritized RTS-CTS resources. Initially, the circuit/module for identifying an RTS-CTS resource 1420 obtains information about the prioritized RTS-CTS resources. For example, the circuit/module for identifying an RTS-CTS resource 1420 may obtain a list of these resources from the memory device 1408. The circuit/module for identifying an RTS-CTS resource 1420 processes the obtained information to identify the highest priority RTS-CTS resource (e.g., by comparing priority information indicated for each resource). For example different frequency bands (or timeslots, etc.) for RTS-CTS communication may be associated with different priority values. The circuit/module for identifying an RTS-CTS resource 1420 then outputs an indication of the identified RTS-CTS resource to a component of the apparatus 1400 (e.g., to the memory device 1408, the communication interface 1402, the circuit/module for sending 1424, the circuit module for receiving 1422, or some other component).

The circuit/module for receiving 1422 may include circuitry and/or programming (e.g., code for receiving 1432 stored on the storage medium 1404) adapted to perform several functions relating to, for example, receiving information (e.g., data) from another apparatus. In various implementations, the information to be received may include an RTS, a CTS, or a message. Initially, the circuit/module for receiving 1422 obtains received information. For example, the circuit/module for receiving 1422 may obtain this information from a component of the apparatus 1400 (e.g., the receiver 1416, the memory device 1408, or some other component) or directly from a device (e.g., a D2D device) that transmitted the information. In some implementations, the circuit/module for receiving 1422 identifies a memory location of a value in the memory device 1408 and invokes a read of that location to receive the information. In some implementations, the circuit/module for receiving 1422 processes (e.g., decodes) the received information. The circuit/module for receiving 1422 outputs the received information (e.g., stores the received information in the memory device 1408 or sends the information to another component of the apparatus 1400). In some implementations, the receiver 1416 includes or embodies the circuit/module for receiving 1422 and/or includes the code for receiving 1432.

The circuit/module for sending 1424 may include circuitry and/or programming (e.g., code for sending 1434 stored on the storage medium 1404) adapted to perform several functions relating to, for example, sending information (e.g., data) to another apparatus. Initially, the circuit/module for sending 1424 obtains the information to be sent (e.g., from the memory device 1408, or some other component). In various implementations, the information to be sent may include an RTS, a CTS, or a message. The circuit/module for sending 1424 may then format the information for sending (e.g., in a message, according to a protocol, etc.). The circuit/module for sending 1424 then causes the information to be sent via a wireless communication medium (e.g., via D2D signaling). To this end, the circuit/module for sending 1424 may send the data to the transmitter 1414 or some other component for transmission. In some implementations, the transmitter 1414 includes or embodies the circuit/module for sending 1424 and/or includes the code for sending 1434.

The circuit/module for setting up a connection 1426 may include circuitry and/or programming (e.g., code for setting up a connection 1436 stored on the storage medium 1404) adapted to perform several functions relating to, for example, setting up a connection between a first apparatus and a second apparatus. In some implementations, the circuit/module for setting up a connection 1426 generates a first message as a result of the apparatus 1400 receiving a first CTS. This message may indicate one or more RTS-CTS resources to be used for subsequent communication between the apparatuses. In some implementations, the circuit/module for setting up a connection 1426 exchanges parameters (e.g., frequency band, QoS parameters, HARQ parameters, etc.) to be used for the connection with another apparatus. In some implementations, the circuit/module for setting up a connection 1426 communicates via D2D signaling to establish the connection.

The circuit/module for identifying a timeslot 1428 may include circuitry and/or programming (e.g., code for identifying a timeslot 1438 stored on the storage medium 1404) adapted to perform several functions relating to, for example, identifying a timeslot to be monitored. Initially, the circuit/module for identifying a timeslot 1428 obtains information about the apparatus 1400. In some implementations, the circuit/module for identifying a timeslot 1428 obtains a device identifier from the memory device 1408 (e.g., identifying a device to which data is to be sent or from which data is to be received). In some implementations, the circuit/module for identifying a timeslot 1428 executes a function (e.g., a hash algorithm) using the device identifier as an input to generate a list of one or more timeslots corresponding to the device. In other implementations, the circuit/module for identifying a timeslot 1428 obtains information associated with this device identifier from the memory device 1408 (e.g., a list of timeslots corresponding to the device). The circuit/module for identifying a timeslot 1428 then outputs an indication of the identified timeslot(s) to a component of the apparatus 1400 (e.g., to the memory device 1408, the communication interface 1402, the circuit/module for sending 1424, the circuit module for receiving 1422, or some other component).

As mentioned above, programming stored by the storage medium 1404, when executed by the processing circuit 1410, causes the processing circuit 1410 to perform one or more of the various functions and/or process operations described herein. For example, the storage medium 1404 may include one or more of the code for identifying an RTS-CTS resource 1430, the code for receiving 1432, the code for sending 1434, the code for setting up a connection 1436, or the code for identifying a timeslot 1438.

Second Example Process

Figure 15:
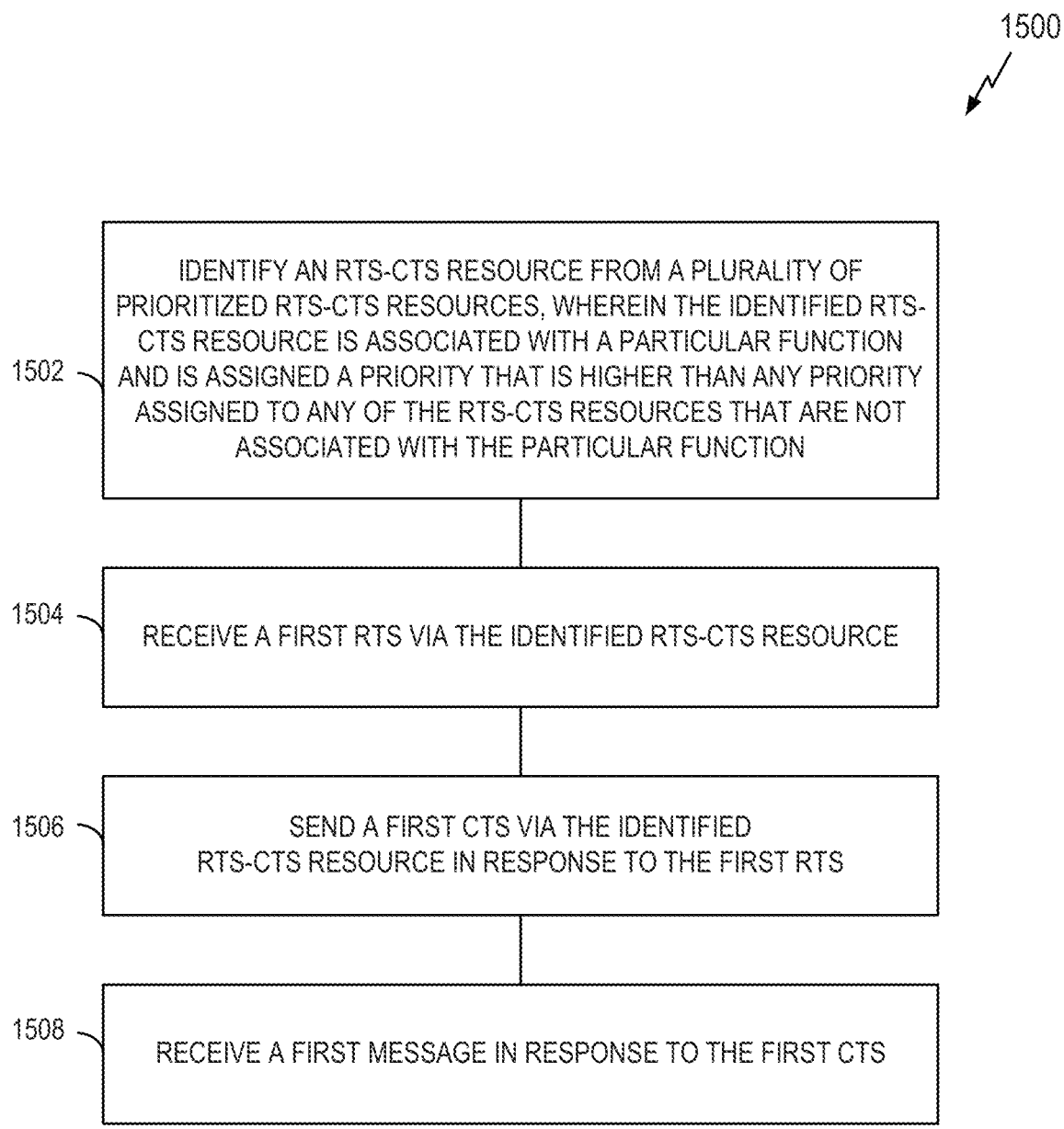
FIG. 15 illustrates an example of another process employing prioritized RTS-CTS resources in accordance with some aspects of the disclosure.

FIG. 15 illustrates a process 1500 for supporting communication in accordance with some aspects of the disclosure. The process 1500 may take place within a processing circuit (e.g., the processing circuit 1410 of FIG. 14), which may be located in a device that supports D2D communication, a base station, an access terminal, or some other suitable apparatus. In some aspects, the process 1500 may take place within a node that is the target of communication. Of course, in various aspects within the scope of the disclosure, the process 1500 may be implemented by any suitable apparatus capable of supporting operations that employ prioritized RTS-CTS resources.

In some aspects, the process 1500 may involve communication where request-to-send and clear-to-send (RTS-CTS) resources are prioritized. For example, different RTS-CTS resource may be defined as being either a high priority RTS-CTS resource or a low priority RTS-CTS resource. In some aspects, the RTS-CTS resources may include at least one of: a frequency tone, a sequence of frequency tones, a frequency band, or an orthogonal code. In some aspects, the prioritized RTS-CTS resources may be associated with different functions.

At block 1502, an apparatus (e.g., a D2D device) identifies an RTS-CTS resource from a plurality of prioritized RTS-CTS resources. The identified resource may be associated with a particular function. In addition, the identified resource may be assigned a priority that is higher than any priority assigned to any of the RTS-CTS resources that are not associated with the particular function.

In some aspects, the particular function may include setting up a connection and/or broadcasting a type of message having a higher priority than other types of messages. In some aspects, an RTS-CTS resource that is not associated with the particular function may be associated with a particular apparatus (e.g., a particular wireless communication device). In some aspects, an RTS-CTS resource that is not associated with the particular function may be associated with a particular link (e.g., a particular wireless communication link between two wireless communication devices). In some aspects, an RTS-CTS resource that is not associated with the particular function may be associated with a connection that is already set up.

In some aspects, the process 1500 further includes identifying a timeslot to be monitored for RTS signaling. In this case, the first RTS may be received during the identified timeslot.

In some aspects, the RTS-CTS resources include a highest priority RTS-CTS resource. In this case, the identification of the RTS-CTS resource may include selecting the highest priority RTS-CTS resource.

In some aspects, a first plurality of the RTS-CTS resources are defined as having a higher priority than a second plurality of the RTS-CTS resources. In this case, the identification of the RTS-CTS resource may involve selecting one of the first plurality of RTS-CTS resources. In addition, the process 1500 may further include identifying one of the RTS-CTS resources as a particular RTS-CTS resource to be monitored for RTS signaling.

At block 1504, the apparatus receives a first RTS via the identified RTS-CTS resource. For example, the apparatus may monitor the identified RTS-CTS resource in expectation of setting up a connection to send or receive packets.

In some aspects, the first RTS might not be directed to a particular apparatus (e.g., wireless communication device). For example, a receiver address (RA) included in the first RTS may indicate that the first RTS is being broadcast. Thus, in this case, the RA might not include an address of any particular receiver.

At block 1506, the apparatus sends a first CTS via the identified RTS-CTS resource in response to the first RTS received at block 1504.

At block 1508, a first message is received in response to the first CTS. In some aspects, the first message is to set up a connection between a first apparatus and a second apparatus. In some aspects, the first message comprises an identifier of the first apparatus and an identifier of the second apparatus. In some aspects, the first message is a type of broadcast message that is associated with a higher priority than other broadcast messages.

In some aspects, the process 1500 further includes sending a second RTS via the identified RTS-CTS resource; receiving a second CTS in response to the second RTS; and sending a second message in response to the second CTS. In some aspects, the first RTS, the first CTS, and the first message may be communicated during a first timeslot; and the second RTS, the second CTS, and the second message may be communicated during a second timeslot that follows (e g, immediately follows) the first timeslot.

In some aspects, the first message indicates (e.g., includes an identifier of) at least one RTS-CTS resource. In this case, the process 1500 may further include sending a second RTS via one of the indicated at least one RTS-CTS resource.

In some aspects, the process 1500 further includes sending a second message in response to the first message. In this case, the first RTS, the first CTS, the first message, and the second message may be communicated during a single timeslot. In some aspects, the first RTS is received during a first sub-slot of the timeslot; the first CTS is sent during a second sub-slot of the timeslot; the first message is received during a third sub-slot of the timeslot; and the second message is sent during a fourth sub-slot of the timeslot.

In some aspects, the process 1500 further includes identifying a timeslot to be monitored for RTS signaling, wherein the first RTS is received during the identified timeslot.

Third Example Apparatus

Figure 16:
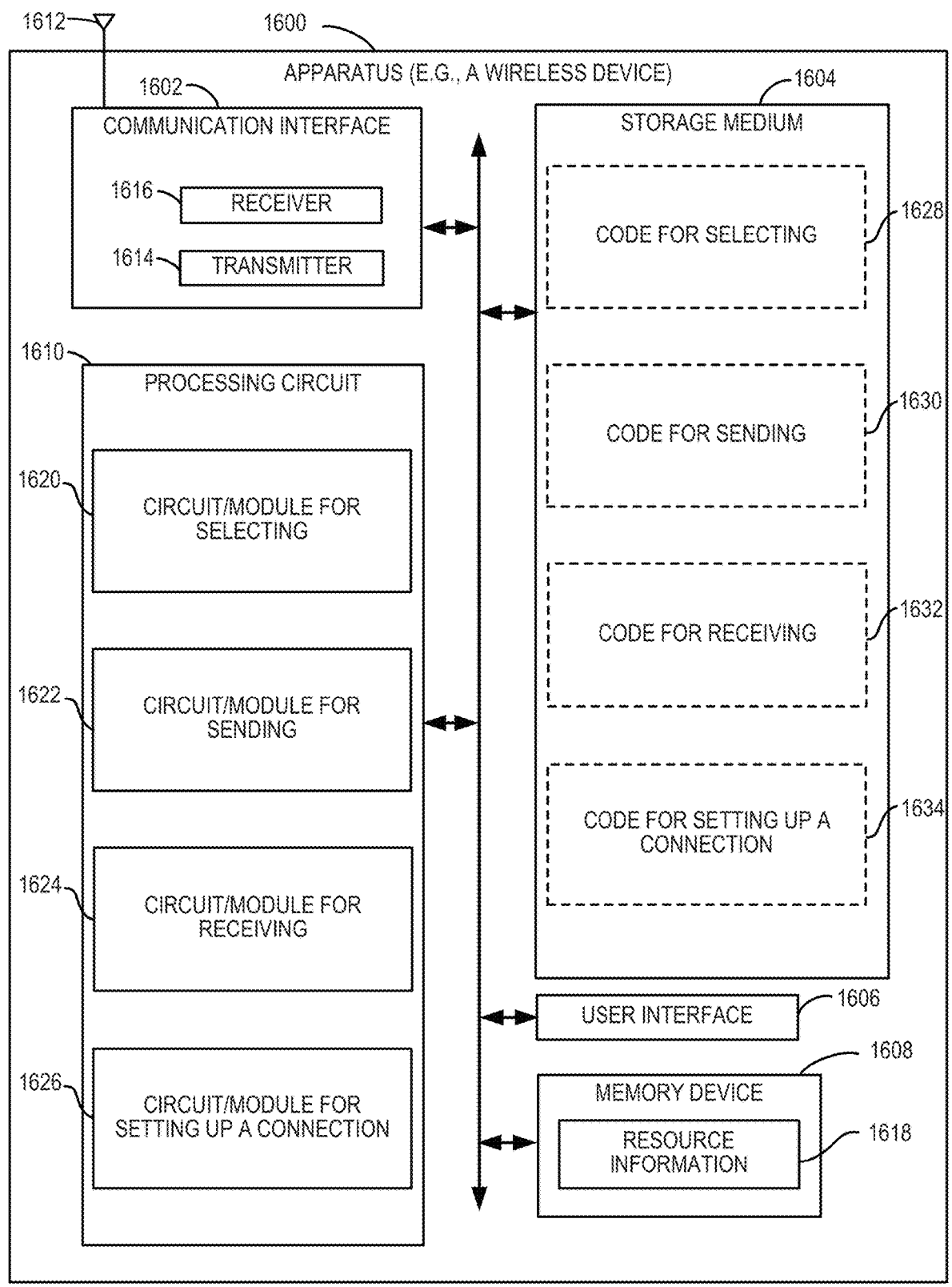
FIG. 16 illustrates a block diagram of an example hardware implementation for another apparatus (e.g., an electronic device) that can employ prioritized RTS-CTS resources in accordance with some aspects of the disclosure.

FIG. 16 illustrates a block diagram of an example hardware implementation of an apparatus 1600 configured to communicate according to one or more aspects of the disclosure. For example, the apparatus 1600 could embody or be implemented within a device that supports D2D communication, a UE, an eNB, or some other type of device that supports wireless communication. In various implementations, the apparatus 1600 could embody or be implemented within an access terminal, an access point, or some other type of device. In various implementations, the apparatus 1600 could embody or be implemented within a mobile phone, a smart phone, a tablet, a portable computer, a server, a personal computer, a sensor, an entertainment device, a medical device, or any other electronic device having circuitry.

The apparatus 1600 includes a communication interface (e.g., at least one transceiver) 1602, a storage medium 1604, a user interface 1606, a memory device 1608 (e.g., storing resource-related information 1618), and a processing circuit (e.g., at least one processor) 1610. In various implementations, the user interface 1606 may include one or more of: a keypad, a display, a speaker, a microphone, a touchscreen display, of some other circuitry for receiving an input from or sending an output to a user. The communication interface 1602 may be coupled to one or more antennas 1612, and may include a transmitter 1614 and a receiver 1616. In general, the components of FIG. 16 may be similar to corresponding components of the apparatus 1200 of FIG. 12.

According to one or more aspects of the disclosure, the processing circuit 1610 may be adapted to perform any or all of the features, processes, functions, operations and/or routines for any or all of the apparatuses described herein. For example, the processing circuit 1610 may be configured to perform any of the steps, functions, and/or processes described with respect to FIGS. 1-11 and 17. As used herein, the term "adapted" in relation to the processing circuit 1610 may refer to the processing circuit 1610 being one or more of configured, employed, implemented, and/or programmed to perform a particular process, function, operation and/or routine according to various features described herein.

The processing circuit 1610 may be a specialized processor, such as an application specific integrated circuit (ASIC) that serves as a means for (e.g., structure for) carrying out any one of the operations described in conjunction with FIGS. 1-11 and 17. The processing circuit 1610 may serve as one example of a means for transmitting and/or a means for receiving.

According to at least one example of the apparatus 1600, the processing circuit 1610 may include one or more of a circuit/module for selecting (e.g., selecting an RTS-CTS resource) 1620, a circuit/module for sending 1622, a circuit/module for receiving 1624, and a circuit/module for setting up a connection 1626.

As mentioned above, programming stored by the storage medium 1604, when executed by the processing circuit 1610, causes the processing circuit 1610 to perform one or more of the various functions and/or process operations described herein. For example, the storage medium 1604 may include one or more of the code for selecting 1628, the code for sending 1630, the code for receiving 1632, or the code for setting up a connection 1634.

Third Example Process

Figure 17:
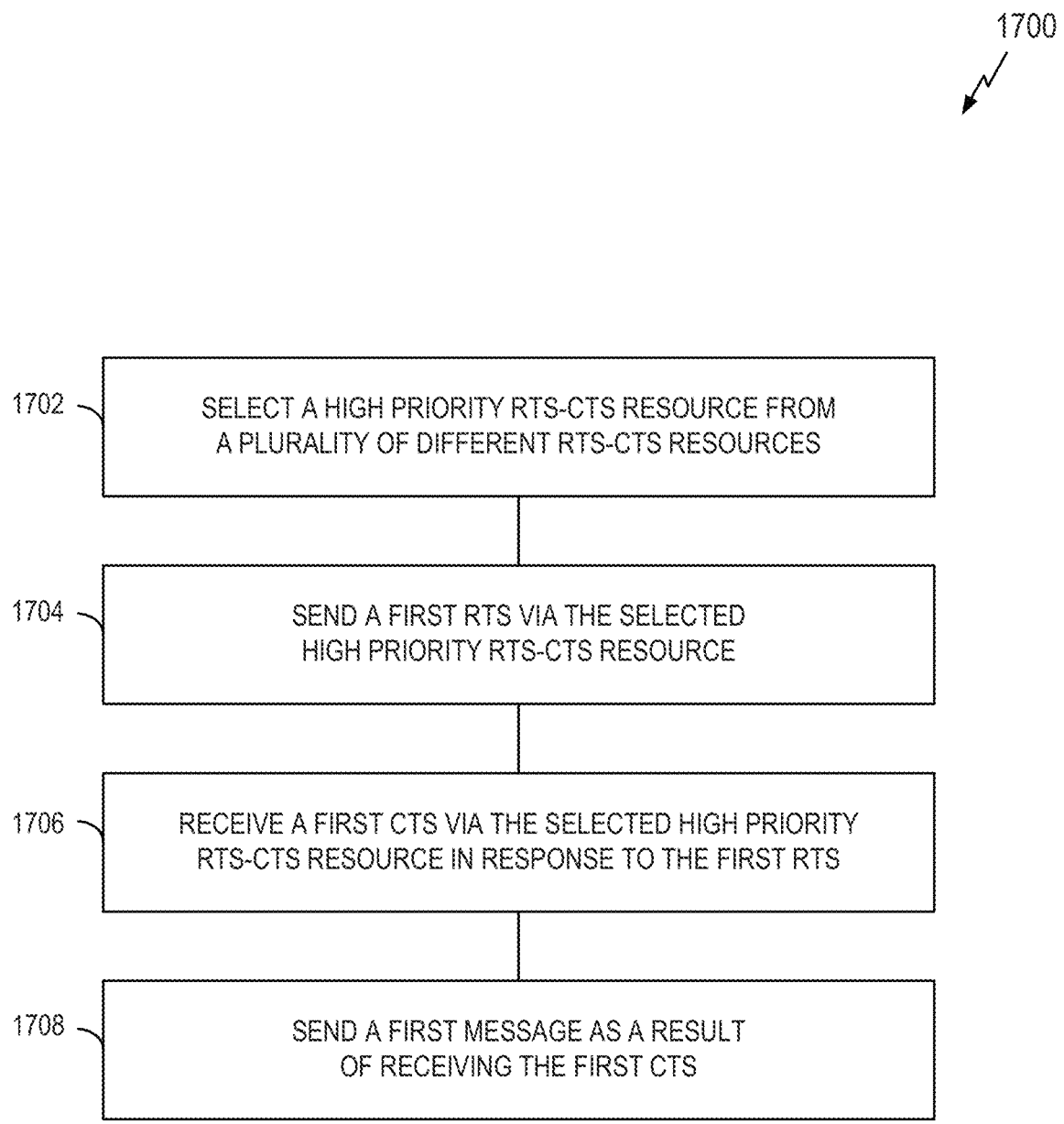
FIG. 17 illustrates an example of another process employing prioritized RTS-CTS resources in accordance with some aspects of the disclosure.

FIG. 17 illustrates a process 1700 for supporting communication in accordance with some aspects of the disclosure. The process 1700 may take place within a processing circuit (e.g., the processing circuit 1610 of FIG. 16), which may be located in a device that supports D2D communication, an access terminal, a base station, or some other suitable apparatus. In some aspects, the process 1700 may take place within a node that is initiating communication. Of course, in various aspects within the scope of the disclosure, the process 1700 may be implemented by any suitable apparatus capable of supporting operations that employ prioritized RTS-CTS resources.

In some aspects, the process 1700 may involve communication where different request-to-send and clear-to-send (RTS-CTS) resources are statically defined as being either a high priority RTS-CTS resource or a low priority RTS-CTS resource. In some aspects, the RTS-CTS resources may include at least one of: a frequency tone, a sequence of frequency tones, a frequency band, or an orthogonal code.

At block 1702, a high priority RTS-CTS resource is selected from the different RTS-CTS resources.

In some aspects, the different RTS-CTS resources include a highest priority RTS-CTS resource. In this case, the selection of the high priority RTS-CTS resource may include selecting the highest priority RTS-CTS resource.

In some aspects, a plurality of the different RTS-CTS resources are defined as being a high priority RTS-CTS resource. In this case, the selection of the high priority RTS-CTS resource may involve selecting one of the plurality of different RTS-CTS resources defined as being a high priority RTS-CTS resource.

At block 1704, a first RTS is sent via the selected high priority RTS-CTS resource.

At block 1706, a first CTS is received via the selected high priority RTS-CTS resource in response to the first RTS.

At block 1708, a first message is sent as a result of receiving the first CTS. In some aspects, the first message is to set up a connection between a first apparatus and a second apparatus. In some aspects, the first message comprises an identifier of the first apparatus and an identifier of the second apparatus. In some aspects, the first message is a type of broadcast message that is associated with a higher priority than other broadcast messages.

In some aspects, the first message is for communication with a target apparatus. In this case, the selection of the high priority RTS-CTS resource may involve identifying one of the plurality of the different RTS-CTS resources that is associated with the target apparatus.

In some aspects, the process 1700 further includes receiving a second RTS via the selected high priority RTS-CTS resource; sending a second CTS in response to the second RTS; and receiving a second message in response to the second CTS. In some aspects, the first RTS, the first CTS, and the first message may be communicated during a first timeslot; and the second RTS, the second CTS, and the second message may be communicated during a second timeslot that follows the first timeslot.

In some aspects, the first message indicates at least one RTS-CTS resource. In this case, the process 1700 may further include receiving a second RTS via one of the indicated at least one RTS-CTS resource.

In some aspects, the process 1700 further includes receiving a second message in response to the first message. In this case, the first RTS, the first CTS, the first message, and the second message may be communicated during a single timeslot. In some aspects, the first RTS is sent during a first sub-slot of the timeslot; and the first CTS is received during a second sub-slot of the timeslot. In this case, the method may further include sending a second CTS during the second sub-slot.

In some aspects, the first message is for communication with a target apparatus. In this case, the process 1700 may further include identifying a timeslot that is associated with the target apparatus, whereby the first RTS is sent during the identified timeslot.

Fourth Example Apparatus

Figure 18:
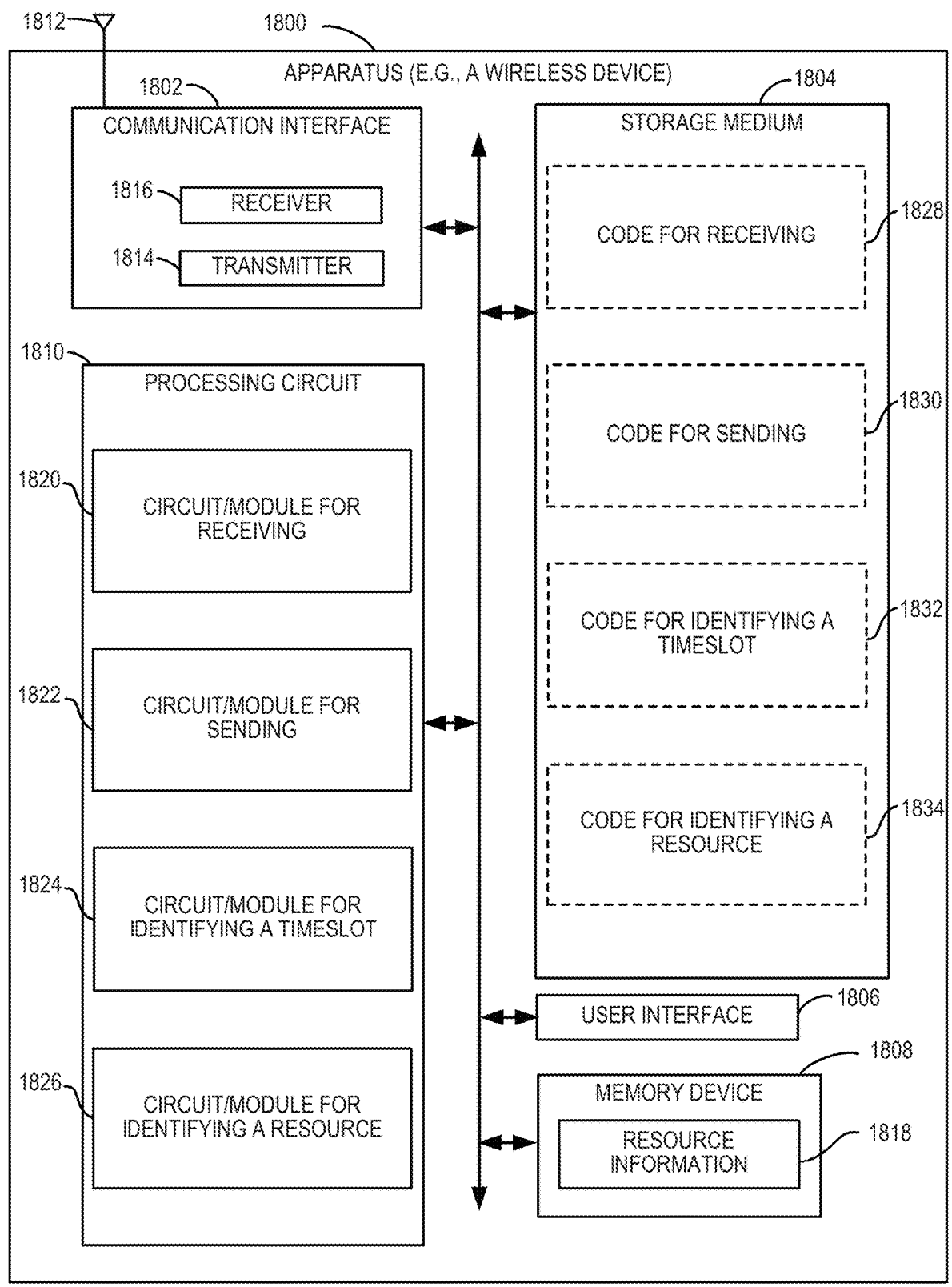
FIG. 18 illustrates a block diagram of an example hardware implementation for another apparatus (e.g., an electronic device) that can employ prioritized RTS-CTS resources in accordance with some aspects of the disclosure.

FIG. 18 illustrates a block diagram of an example hardware implementation of an apparatus 1800 configured to communicate according to one or more aspects of the disclosure. For example, the apparatus 1800 could embody or be implemented within a device that supports D2D communication, a UE, an eNB, or some other type of device that supports wireless communication. In various implementations, the apparatus 1800 could embody or be implemented within an access terminal, an access point, or some other type of device. In various implementations, the apparatus 1800 could embody or be implemented within a mobile phone, a smart phone, a tablet, a portable computer, a server, a personal computer, a sensor, an entertainment device, a medical device, or any other electronic device having circuitry.

The apparatus 1800 includes a communication interface (e.g., at least one transceiver) 1802, a storage medium 1804, a user interface 1806, a memory device 1808 (e.g., storing resource-related information 1818), and a processing circuit (e.g., at least one processor) 1810. In various implementations, the user interface 1806 may include one or more of: a keypad, a display, a speaker, a microphone, a touchscreen display, of some other circuitry for receiving an input from or sending an output to a user. The communication interface 1802 may be coupled to one or more antennas 1812, and may include a transmitter 1814 and a receiver 1816. In general, the components of FIG. 18 may be similar to corresponding components of the apparatus 1200 of FIG. 12.

According to one or more aspects of the disclosure, the processing circuit 1810 may be adapted to perform any or all of the features, processes, functions, operations and/or routines for any or all of the apparatuses described herein. For example, the processing circuit 1810 may be configured to perform any of the steps, functions, and/or processes described with respect to FIGS. 1-11 and 19. As used herein, the term "adapted" in relation to the processing circuit 1810 may refer to the processing circuit 1810 being one or more of configured, employed, implemented, and/or programmed to perform a particular process, function, operation and/or routine according to various features described herein.

The processing circuit 1810 may be a specialized processor, such as an application specific integrated circuit (ASIC) that serves as a means for (e.g., structure for) carrying out any one of the operations described in conjunction with FIGS. 1-11 and 19. The processing circuit 1810 may serve as one example of a means for transmitting and/or a means for receiving.

According to at least one example of the apparatus 1800, the processing circuit 1810 may include one or more of a circuit/module for receiving 1820, a circuit/module for sending 1822, a circuit/module for identifying a timeslot 1824, and a circuit/module for identifying a resource (e.g., identifying an RTS-CTS resource) 1826.

As mentioned above, programming stored by the storage medium 1804, when executed by the processing circuit 1810, causes the processing circuit 1810 to perform one or more of the various functions and/or process operations described herein. For example, the storage medium 1804 may include one or more of the code for receiving 1828, the code for sending 1830, the code for identifying a timeslot 1832, or the code for identifying a resource 1834.

Fourth Example Process

Figure 19:
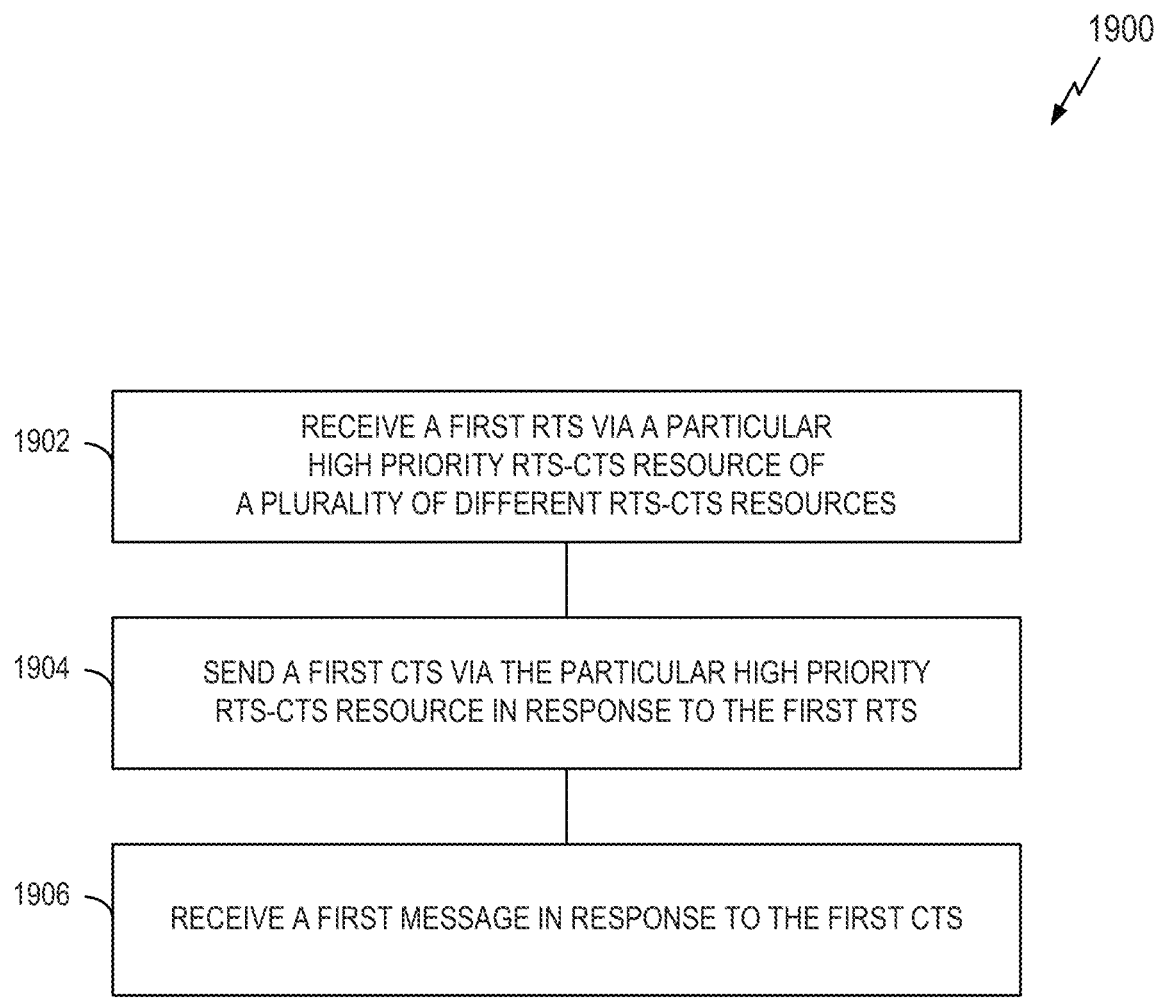
FIG. 19 illustrates an example of another process employing prioritized RTS-CTS resources in accordance with some aspects of the disclosure.

FIG. 19 illustrates a process 1900 for supporting communication in accordance with some aspects of the disclosure. The process 1900 may take place within a processing circuit (e.g., the processing circuit 1810 of FIG. 18), which may be located in a device that supports D2D communication, a base station, an access terminal, or some other suitable apparatus. In some aspects, the process 1900 may take place within a node that is the target of communication. Of course, in various aspects within the scope of the disclosure, the process 1900 may be implemented by any suitable apparatus capable of supporting operations that employ prioritized RTS-CTS resources.

In some aspects, the process 1900 may involve communication where different request-to-send and clear-to-send (RTS-CTS) resources are statically defined as being either a high priority RTS-CTS resource or a low priority RTS-CTS resource. In some aspects, the RTS-CTS resources may include at least one of: a frequency tone, a sequence of frequency tones, a frequency band, or an orthogonal code.

At block 1902, a first RTS is received via a particular high priority RTS-CTS resource of the different RTS-CTS resources.

In some aspects, the process 1900 further includes identifying a timeslot to be monitored for RTS signaling. In this case, the first RTS may be received during the identified timeslot.

In some aspects, the different RTS-CTS resources include a highest priority RTS-CTS resource. In this case, the particular RTS-CTS resource may be the highest priority RTS-CTS resource.

In some aspects, a plurality of the different RTS-CTS resources are defined as being a high priority RTS-CTS resource. In this case, the particular RTS-CTS resource may be one of the plurality of different RTS-CTS resources defined as being a high priority RTS-CTS resource. In addition, the process 1900 may further include identifying one of the plurality of different RTS-CTS resources as the particular RTS-CTS resource to be monitored for RTS signaling.

At block 1904, a first CTS is sent via the particular high priority RTS-CTS resource in response to the first RTS.

At block 1906, a first message is received in response to the first CTS. In some aspects, the first message is to set up a connection between a first apparatus and a second apparatus. In some aspects, the first message comprises an identifier of the first apparatus and an identifier of the second apparatus. In some aspects, the first message is a type of broadcast message that is associated with a higher priority than other broadcast messages.

In some aspects, the process 1900 further includes sending a second RTS via the particular high priority RTS-CTS resource; receiving a second CTS in response to the second RTS; and sending a second message in response to the second CTS. In some aspects, the first RTS, the first CTS, and the first message may be communicated during a first timeslot; and the second RTS, the second CTS, and the second message may be communicated during a second timeslot that follows the first timeslot.

In some aspects, the first message indicates at least one RTS-CTS resource. In this case, the process 1900 may further include sending a second RTS via one of the indicated at least one RTS-CTS resource.

In some aspects, the process 1900 further includes sending a second message in response to the first message. In this case, the first RTS, the first CTS, the first message, and the second message may be communicated during a single timeslot. In some aspects, the first RTS is received during a first sub-slot of the timeslot; the first CTS is sent during a second sub-slot of the timeslot; the first message is received during a third sub-slot of the timeslot; and the second message is sent during a fourth sub-slot of the timeslot.

In some aspects, the process 1900 further includes identifying a timeslot to be monitored for RTS signaling, wherein the first RTS is received during the identified timeslot.

Additional Aspects

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the features discussed herein. In other words, while one or more implementations may have been discussed as having certain features, one or more of such features may also be used in accordance with any of the various implementations discussed herein. In similar fashion, while example implementations may have been discussed herein as device, system, or method implementations, it should be understood that such example implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A method of communication for an apparatus, comprising:

identifying a first request-to-send and clear-to-send (RTS-CTS) resource from a plurality of RTS-CTS frequency resources that is reserved for communicating RTS signals and CTS signals and that is prioritized for a plurality of functions including a connection setup function, wherein the identification of the first RTS-CTS resource comprises determining which resource of the plurality of RTS-CTS frequency resources is reserved for the connection setup function and is assigned a priority that is higher than any priority assigned to any of the plurality of RTS-CTS frequency resources that are not reserved for the connection setup function;

sending a first RTS via the identified first RTS-CTS resource;

receiving a first CTS from another apparatus via the identified first RTS-CTS resource in response to the first RTS;

identifying a second RTS-CTS resource from the plurality of RTS-CTS frequency resources for a connection between the apparatus and the other apparatus, wherein the second RTS-CTS resource has a lower priority than the first RTS-CTS resource;

sending a first message as a result of receiving the first CTS, wherein the first message includes an indication of the second RTS-CTS resource;

using the second RTS-CTS resource for the connection between the apparatus and the other apparatus;

receiving a second message in response to the first message, the first RTS, the first CTS, the first message, and the second message are communicated during a timeslot, wherein the first RTS is sent during a first sub-slot of the timeslot, the first CTS is received during a second sub-slot of the timeslot; and sending a second CTS during the second sub-slot.

2. The method of claim 1, wherein the plurality of functions further include:

broadcasting a type of message having a higher priority than other types of messages.

3. The method of claim 1, further comprising setting up the connection between a first apparatus and a second apparatus based on the first message, wherein the first message comprises an identifier of the first apparatus and an identifier of the second apparatus.

4. The method of claim 1, wherein the first message is a type of broadcast message that is not directed to a particular apparatus.

5. The method of claim 1, further comprising:

receiving a second RTS via the identified first RTS-CTS resource;

sending the second CTS in response to the second RTS; and receiving the second message in response to the second CTS.

6. The method of claim 5, wherein:

the first RTS, the first CTS, and the first message are communicated during a first timeslot; and the second RTS, the second CTS, and the second message are communicated during a second timeslot that follows the first timeslot.

7. The method of claim 1, wherein the using of the second RTS-CTS resource comprises:

receiving a second RTS via the second RTS-CTS resource.

8. The method of claim 1, wherein the plurality of RTS-CTS frequency resources comprises at least one of: a frequency tone, a sequence of frequency tones, or a frequency band.

9. The method of claim 1, wherein:

the method further comprises identifying a timeslot that is associated with the other apparatus; and the first RTS is sent during the identified timeslot.

10. The method of claim 1, wherein:

the plurality of RTS-CTS frequency resources includes a highest priority RTS-CTS resource; and the identification of the first RTS-CTS resource comprises selecting the highest priority RTS-CTS resource.

11. The method of claim 1, wherein:
a first subset of the plurality of RTS-CTS frequency resources is defined as having a higher priority than a second subset of the plurality of RTS-CTS frequency resources; and
the identification of the first RTS-CTS resource comprises selecting one of the first subset of the plurality of RTS-CTS frequency resources.

12. The method of claim 11, wherein:
the identification of the first RTS-CTS resource comprises identifying one of the plurality of RTS-CTS frequency resources that is associated with the other apparatus.

13. An apparatus for communication, comprising:
a memory device; and
a processing circuit coupled to the memory device and configured to:
identify a first request-to-send and clear-to-send (RTS-CTS) resource from a plurality of RTS-CTS frequency resources that is reserved for communicating RTS signals and CTS signals and that is prioritized for a plurality of functions including a connection setup function, wherein the identification of the first RTS-CTS resource comprises determining which resource of the plurality of RTS-CTS frequency resources is reserved for the connection setup function and is assigned a priority that is higher than any priority assigned to any of the plurality of RTS-CTS frequency resources that are not reserved for the connection setup function;
send a first RTS via the identified first RTS-CTS resource;
receive a first CTS from another apparatus via the identified first RTS-CTS resource in response to the first RTS;
identify a second RTS-CTS resource from the plurality of RTS-CTS frequency resources for a connection between the apparatus and the other apparatus, wherein the second RTS-CTS resource has a lower priority than the first RTS-CTS resource;
send a first message as a result of receiving the first CTS, wherein the first message includes an indication of the second RTS-CTS resource;
use the second RTS-CTS resource for the connection between the apparatus and the other apparatus;
receive a second message in response to the first message, the first RTS, the first CTS, the first message, and the second message are communicated during a timeslot,
wherein the first RTS is sent during a first sub-slot of the timeslot, the first CTS is received during a second sub-slot of the timeslot; and
send a second CTS during the second sub-slot.

14. The apparatus of claim 13, wherein the processing circuit is further configured to set up the connection between the apparatus and the other apparatus based on the first message.

15. The apparatus of claim 14, wherein the first message comprises an identifier of the apparatus and an identifier of the other apparatus.

16. The apparatus of claim 13, wherein the first message is a type of broadcast message.

17. The apparatus of claim 13, wherein the processing circuit is further configured to:
receive a second RTS via the identified first RTS-CTS resource;
send the second CTS in response to the second RTS; and
receive the second message in response to the second CTS.

18. The apparatus of claim 17, wherein:
the first RTS, the first CTS, and the first message are communicated during a first timeslot; and
the second RTS, the second CTS, and the second message are communicated during a second timeslot that follows the first timeslot.

19. The apparatus of claim 13, wherein:
the processing circuit is further configured to receive a second RTS via the second RTS-CTS resource.

20. The apparatus of claim 13, wherein the plurality of RTS-CTS frequency resources comprises at least one of: a frequency tone, a sequence of frequency tones, or a frequency band.

21. The apparatus of claim 13, wherein:
the processing circuit is further configured to identify a timeslot that is associated with the other apparatus; and
the first RTS is sent during the identified timeslot.

22. An apparatus for communication, comprising:
means for identifying a first request-to-send and clear-to-send (RTS-CTS) resource from a plurality of RTS-CTS frequency resources that is reserved for communicating RTS signals and CTS signals and that is prioritized for a plurality of functions including a connection setup function, wherein the identification of the first RTS-CTS resource comprises determining which resource of the plurality of RTS-CTS frequency resources is reserved for the connection setup function and is assigned a priority that is higher than any priority assigned to any of the plurality of RTS-CTS frequency resources that are not reserved for the connection setup function;
means for sending a first RTS via the identified first RTS-CTS resource;
means for receiving a first CTS from another apparatus via the identified first RTS-CTS resource in response to the first RTS;
means for identifying a second RTS-CTS resource from the plurality of RTS-CTS frequency resources for a connection between the apparatus and the other apparatus, wherein the second RTS-CTS resource has a lower priority than the first RTS-CTS resource,
wherein the means for sending is configured to send a first message as a result of receiving the first CTS, and wherein the first message includes an indication of the second RTS-CTS resource;
means for using the second RTS-CTS resource for the connection between the apparatus and the other apparatus;
means for receiving a second message in response to the first message, the first RTS, the first CTS, the first message, and the second message are communicated during a timeslot,
wherein the first RTS is sent during a first sub-slot of the timeslot, the first CTS is received during a second sub-slot of the timeslot; and
means for sending a second CTS during the second sub-slot.

23. A non-transitory computer-readable medium storing computer-executable code for communication by an apparatus, the computer-readable medium including code for causing a computer to:
identify a first request-to-send and clear-to-send (RTS-CTS) resource from a plurality of RTS-CTS frequency resources that is reserved for communicating RTS signals and CTS signals and that is prioritized for a plurality of functions including a connection setup function, wherein the identification of the first RTS-CTS resource comprises determining which resource of the plurality of RTS-CTS frequency resources is reserved for the connection setup function and is assigned a priority that is higher than any priority assigned to any of the plurality of RTS-CTS frequency resources that are not reserved for the connection setup function;

send a first RTS via the identified first RTS-CTS resource;

receive a first CTS from another apparatus via the identified first RTS-CTS resource in response to the first RTS;

identify a second RTS-CTS resource from the plurality of RTS-CTS frequency resources for a connection between the apparatus and the other apparatus, wherein the second RTS-CTS resource has a lower priority than the first RTS-CTS resource;

send a first message as a result of receiving the first CTS, wherein the first message includes an indication of the second RTS-CTS resource;

use the second RTS-CTS resource for the connection between the apparatus and the other apparatus;

receive a second message in response to the first message, the first RTS, the first CTS, the first message, and the second message are communicated during a timeslot, wherein the first RTS is sent during a first sub-slot of the timeslot, the first CTS is received during a second sub-slot of the timeslot; and send a second CTS during the second sub-slot.

* * * * *